United States Patent
Haneda et al.

(10) Patent No.: US 9,434,377 B2
(45) Date of Patent: Sep. 6, 2016

(54) HYBRID DRIVE DEVICE
(71) Applicants: AISIN SEIKI KABUSHIKI KAISHA, Kariya-shi (JP); AISIN AW CO., LTD., Anjo-shi (JP)
(72) Inventors: Yoshitomi Haneda, Anjo (JP); Yasuhiro Ishihara, Anjo (JP); Yoshinori Ono, Nukata-gun (JP); Masaki Nomura, Anjo (JP); Shiko Yoshimura, Nishio (JP); Shigeki Takami, Anjo (JP); Tomoo Atarashi, Kariya (JP); Takafumi Koshida, Anjo (JP)
(73) Assignees: AISIN SEIKI KABUSHIKI KAISHA, Kariya-shi (JP); AISIN AW CO., LTD., Anjo-shi (JP)
( * ) Notice: Subject to any disclaimer, the term of this patent is extended or adjusted under 35 U.S.C. 154(b) by 0 days.
(21) Appl. No.: 14/418,685
(22) PCT Filed: Jul. 26, 2013
(86) PCT No.: PCT/JP2013/070396
§ 371 (c)(1),
(2) Date: Jan. 30, 2015
(87) PCT Pub. No.: WO2014/021233
PCT Pub. Date: Feb. 6, 2014
(65) Prior Publication Data
US 2015/0203104 A1 Jul. 23, 2015
(30) Foreign Application Priority Data
Aug. 2, 2012 (JP) .................................. 2012-171853
(51) Int. Cl.
*B60W 20/00* (2016.01)
*B60K 6/445* (2007.10)
(Continued)
(52) U.S. Cl.
CPC .............. *B60W 20/40* (2013.01); *B60K 6/445* (2013.01); *B60L 11/14* (2013.01); *B60W 10/02* (2013.01);
(Continued)
(58) Field of Classification Search
CPC ............. B60W 10/02; B60W 10/023; B60W 10/026; B60W 20/00; B60W 20/10; B60W 20/40; B60W 2510/02; B60W 2510/0208; B60W 2510/0216; B60W 2510/0225; B60W 2510/0233; B60W 2510/0241; B60W 2510/025; B60W 2510/0258; B60W 2510/0266; B60W 2510/0275; B60W 2510/0283; B60W 2510/0291; B60W 2710/00; B60W 2710/02; B60W 2710/021; B60W 2710/022; B60W 2710/023; B60W 2710/024; B60W 2710/025; B60W 2710/026; B60W 2710/027; B60W 2710/028; B60W 2710/029; B60L 2240/36
USPC .............................. 701/22, 67; 903/346, 912
See application file for complete search history.

(56) References Cited

U.S. PATENT DOCUMENTS

| 2004/0147366 A1* | 7/2004 | Aoki | ........................ B60K 6/44 477/6 |
| 2007/0272456 A1* | 11/2007 | Shiiba | ..................... B60K 6/48 180/65.275 |

(Continued)

FOREIGN PATENT DOCUMENTS

| JP | 2000-324610 A | 11/2000 |
| JP | 2003-065364 | 3/2003 |

(Continued)

OTHER PUBLICATIONS

International Search Report Issued Sep. 10, 2013 in PCT/JP13/070396 filed Jul. 26, 2013.

*Primary Examiner* — Thomas Tarcza
*Assistant Examiner* — Richard Goldman
(74) *Attorney, Agent, or Firm* — Oblon, McClelland, Maier & Neustadt, L.L.P.

(57) ABSTRACT

A hybrid drive device has a clutch connecting and disconnecting an output shaft and an input shaft, a first motor generator that rotates in conjunction with the rotation of the input shaft, an allowable clutch heat generation amount calculation portion that calculates the allowable clutch heat generation amount, an allowable differential clutch rotation speed calculation portion which calculates the allowable differential clutch rotation speed for when engagement starts, on the basis of the allowable clutch heat generation amount, and a motor generator rotation control portion that controls the rotation speed of the first motor generator such that the differential clutch rotation speed when engagement starts and during engagement is no more than the allowable differential clutch rotation speed when engagement starts.

4 Claims, 18 Drawing Sheets

(51) Int. Cl.
  *B60L 11/14* (2006.01)
  *B60W 10/02* (2006.01)
  *B60W 10/08* (2006.01)
  *B60W 30/186* (2012.01)

(52) U.S. Cl.
  CPC .............. *B60W 10/08* (2013.01); *B60W 20/00* (2013.01); *B60W 30/186* (2013.01); *Y02T 10/6239* (2013.01); *Y10S 903/93* (2013.01)

(56) References Cited

U.S. PATENT DOCUMENTS

| | | | | |
|---|---|---|---|---|
| 2009/0143189 A1* | 6/2009 | Hasegawa | ................ | B60K 6/48 477/5 |
| 2012/0203417 A1* | 8/2012 | Matsui | .................... | B60K 6/48 701/22 |
| 2013/0274980 A1* | 10/2013 | Takamura | ................ | B60K 6/48 701/22 |
| 2014/0094342 A1* | 4/2014 | Kobayashi | ............... | B60K 6/48 477/5 |
| 2014/0129066 A1* | 5/2014 | Inoue | ................... | B60W 20/40 701/22 |
| 2014/0162841 A1* | 6/2014 | Kobayashi | ............... | B60K 6/48 477/5 |
| 2014/0171261 A1* | 6/2014 | Haneda | .................... | B60K 6/42 477/5 |
| 2014/0195087 A1* | 7/2014 | Ideshio | ................ | B60W 10/02 701/22 |
| 2014/0222270 A1* | 8/2014 | Tsutsumi | .............. | B60W 20/00 701/22 |
| 2014/0257618 A1* | 9/2014 | Hiasa | ....................... | B60K 6/48 701/22 |
| 2015/0183415 A1* | 7/2015 | Moon | ................... | B60W 10/02 701/22 |
| 2015/0203104 A1* | 7/2015 | Haneda | ................. | B60K 6/445 701/22 |
| 2015/0336570 A1* | 11/2015 | Sugimura | ............... | B60K 6/48 701/22 |

FOREIGN PATENT DOCUMENTS

| | | |
|---|---|---|
| JP | 2009-126479 | 6/2009 |
| JP | 2010-076678 | 4/2010 |
| JP | 2010-188786 | 9/2010 |
| JP | 2010-190254 | 9/2010 |
| JP | 2012-086717 | 5/2012 |

* cited by examiner

HYBRID DRIVE DEVICE

TECHNICAL FIELD

This invention relates to a hybrid drive device which is equipped with a clutch for connecting or disconnecting the output shaft of the engine and the input shaft of a gear mechanism and a motor/generator rotating in association with the rotation of the input shaft.

BACKGROUND ART

Conventionally, a hybrid drive device has been proposed as shown in the Patent Literature 1, which is formed by an engine, a clutch connecting or disconnecting the output shaft of the engine and an input shaft of the gear mechanism and a motor/generator rotating in association with the rotation of the input shaft. According to this hybrid drive device shown in the Patent Literature 1, the engine is restarted from the engine being in a stopped state by gradually increasing the engine rotation speed by gradually transmitting the rotation drive force from the motor/generator to the engine by gradually connecting the clutch which has been in a disconnected state.

CITATION LIST

Patent Literature

Patent Literature 1: JP2010-76678 A

BRIEF SUMMARY OF THE INVENTION

Technical Problem(s)

However, according to the hybrid drive device disclosed in the above Patent literature 1, the engine is re-started by gradually engaging the clutch which has been in the disconnected state and accordingly, when the engine re-starting is very frequently performed, or when the engine is in a low temperature environment state and friction torque of the engine is relatively large, a heat generated due to the clutch sliding operation becomes very high which may lead to a shortening of life duration of the clutch or generation of a deterioration of a performance property of the clutch, which would be a problem of such conventional clutch.

The present invention was made in consideration with the above problems and the object of the invention is to provide a technology that can prevent overheating of a clutch in a hybrid drive device having the clutch for connecting or disconnecting the output shaft of the engine and the input shaft of a gear mechanism and a motor/generator rotating in association with the rotation of the input shaft.

Solution to Problem(s)

The invention associated with claim 1 to solve the above problems is characterized in that the hybrid drive device includes an engine which outputs a rotational drive force to an output shaft, an input shaft which is rotated in association with a rotation of a drive wheel, a clutch disposed between the output shaft and the input shaft for connecting or disconnecting the output shaft and the input shaft, a motor/generator which is rotated in association with a rotation of the input shaft, an allowable clutch heat generation amount calculating means for calculating an allowable clutch heat generation amount which corresponds to a heat generation amount that the clutch can allow under the clutch being in engagement and a motor/generator rotation control means for controlling a rotation speed of the motor/generator not to exceed the allowable clutch heat generation amount calculated by the allowable clutch heat generation amount calculating means.

DETAILED DESCRIPTION OF THE INVENTION

Structure of Hybrid Drive Device

Figure 1:
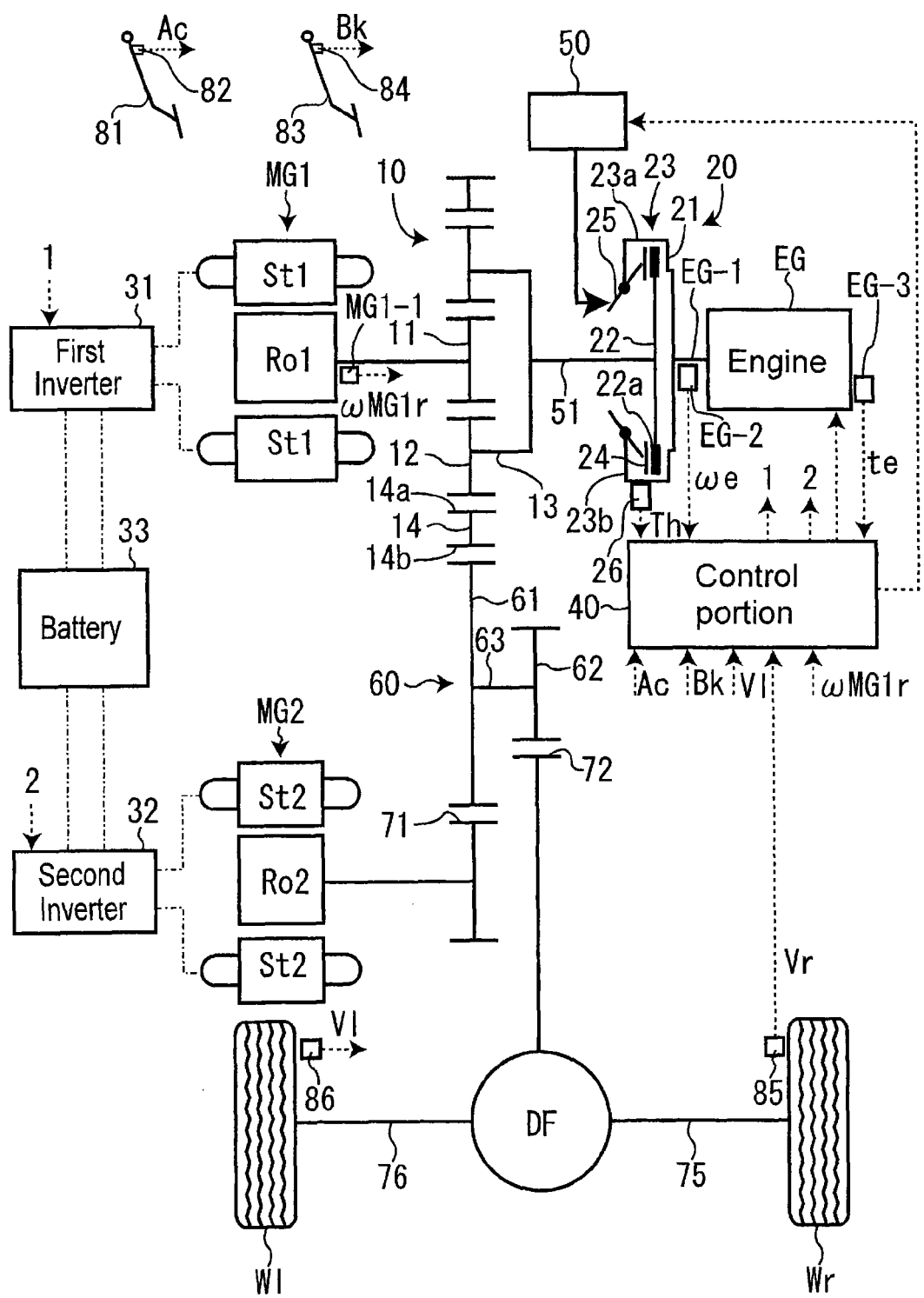
FIG. 1 is a skeleton view indicating the structure of a hybrid drive device according to a first embodiment of the invention.

The embodiment (First embodiment) of the hybrid drive device 100 will be explained with reference to the attached drawings. It is noted here that the broken line indicated in FIG. 1 indicates the information transmittal route for various information and the chain line indicates the transmittal route for electricity. The hybrid vehicle (hereinafter referred to as just "vehicle") is equipped with the hybrid drive device 100.

The hybrid drive device 100 according to this embodiment includes an engine (EG), a first motor/generator (MG1), a second motor/generator (MG2), a planetary gear mechanism 10, a clutch 20, a first inverter 31, a second inverter 32, a battery 33, an actuator 50 and a control portion 40. It is noted here that hereinafter the expression of the state "under clutch being in engagement" means the state of clutch 20 from a disengaged state to a state that the clutch is in connected state.

The engine EG includes a gasoline engine or diesel engine using a fuel of hydrocarbon system such as gasoline or light gas and applies a rotation drive force to the drive wheels (Wl) and (Wr). The rotation drive force is outputted from the engine EG to an output shaft (EG-1) based on a control signal outputted from the control portion 40. An engine rotation speed sensor (EG-2) is provided in the vicinity of the output shaft EG-1. The engine rotation speed sensor EG-2 detects the engine rotation speed $\tilde{\omega}$e which corresponds to the rotation speed of the output shaft EG-1. The detected signal is outputted to the control portion 40. The engine EG is equipped with a water temperature sensor EG-3 which detects the temperature "te" of a coolant for cooling the engine EG and outputs the detected signal to the control portion 40. Further, the engine EG is equipped with a fuel injection device (not shown) for injecting fuel to the suction port and each cylinder of the engine EG. Further, when a gasoline type engine is used as the engine EG, an ignition plug (not shown) is provided at each cylinder.

The clutch 20 is disposed between the output shaft EG-1 and an input shaft 51 of the planetary gear mechanism 10 and connects or disconnects the output shaft EG-1 and the input shaft 51 to electrically control a transmission of transmitting torque therebetween. Any type clutch can be used as long as such control can be performed. According to this embodiment, the clutch 20 is of dry-type, single plate, normally closed type clutch and includes a flywheel 21, a clutch disc 22, a clutch cover 23, a pressure plate 24 and a diaphragm spring 25. The flywheel 21 includes a disc-shaped plate having a predetermined mass. The flywheel 21 is connected to the output shaft EG-1 and is rotatable unitary therewith. The clutch disc 22 is of a disc plate shape and a friction member 22a is provided on the outer brim portion of the disc and faces to the flywheel 21 and is engageable with or detachable from the flywheel 21. The friction member 22a includes a so-called clutch lining and is formed by a metal made aggregate and a synthetic resin-made binder for connecting the aggregate. The clutch disc 22 is connected to the input shaft 51 and rotates unitary therewith.

The clutch cover 23 is formed by a cylindrical portion 23a connected to the outer brim portion of the flywheel 21 provided at the outer peripheral side of the clutch disc 22 and an annular plate shaped side wall 23b extending inwardly in a radial direction from the end portion of the cylindrical portion 23a opposite to the connecting portion with the flywheel 21. The pressure plate 24 is of annular shape and faces to the clutch disc 22 at the opposite side to the facing surface with the flywheel 21 and is engageable with or disengageable from the clutch disc 22.

The diaphragm spring 25 is a so-called dish spring and a diaphragm inclined in a thickness direction is formed thereon. At the central portion of the diaphragm spring 25 in a radial direction is in contact with the inner brim portion of a side peripheral wall 23b of the clutch cover 23 and the outer brim portion of the diaphragm spring 25 is in contact with the pressure plate 24. The diaphragm spring 25 pressurizes the clutch disc 22 onto the flywheel 21 through the pressure plate 24. Under such pressurized condition, the friction member 22a of the clutch disc 22 is pressed by the flywheel 21 and the pressure plate 24 and the clutch disc 22 and the flywheel 21 are rotated together by the friction force generated between the friction member 22a and the flywheel 21 and the pressure plate 24 to thereby connect the output shaft EG-1 and the input shaft 51.

A temperature sensor 26 is provided within a housing (not shown) which accommodates the clutch 20. The temperature "Th" in the housing detected by the temperature sensor 26 is inputted to the control portion 40.

The actuator 50 varies the transmitting torque of the clutch 20 by driving the clutch 20. The actuator 50 presses the inner brim portion of the diaphragm spring 25 or releases the pressurization thereon based on the instructions from the control portion 40. An electric type or a hydraulic type may be used for the actuator 50. When the actuator 50 presses the inner brim portion of the diaphragm spring 25 towards the flywheel 21 side, the diaphragm spring 25 is deformed and the outer brim portion thereof is deformed in a direction separating from the flywheel 21. Then the deformation of the diaphragm spring 25 gradually decreases the pressing force of the flywheel 21 and the pressure plate 24 to the clutch disc 22 and finally the transmitting torque between the clutch disc 22 and the flywheel 21 and the pressure plate 24 is decreased thereby to release the connection between the output shaft EG-1 and the input shaft 51. Thus, the control portion 40 randomly varies the transmitting torque between the clutch disc 22 and the flywheel 21 and the pressure plate 24 by actuating the actuator 50.

The first motor/generator MG-1 is operated as a motor for applying rotation drive force to the drive wheels Wl and Wr, and at the same time is used as a generator which converts a kinetic energy of the vehicle to the electric energy. The first motor/generator MG1 is formed by a first stator (St1) fixed to a case (not shown) and a first rotor Ro1 rotatably provided at the inner peripheral side of the first stator St1. It is noted that a rotation speed sensor (MG1-1) is provided in the vicinity of the first rotor Ro1 (Ro1) which detects the rotation speed $\omega MG1r$ of the first motor/generator MG1 (first rotor Ro1) and outputs the detected signal to the control portion 40.

The first inverter 31 is electrically connected to the first stator St1 and the battery 33. The first inverter 31 is connected to the control portion 40 and establishes communication therebetween. The first inverter 31 converts the DC current supplied from the battery 33 into the AC current by increasing the voltage based on the control signal from the control portion 40 and the converted AC current is supplied to the first stator S to generate the rotation drive force by the first motor/generator MG1 thereby the first motor/generator MG1 being used as a motor. The first inverter 31 controls the first motor/generator MG1 to function as a generator based on the control signal from the control portion 40 and the AC current generated at the first motor/generator MG1 is converted into the DC current and at the same time the voltage is decreased thereby charging the battery 33.

The second motor/generator MG2 is operated as a motor for applying rotation drive force to the drive wheels Wl and Wr, and at the same time is used as a generator which converts a kinetic energy of the vehicle to the electric energy. The second motor/generator MG2 is formed by a second stator St2 fixed to a case (not shown) and a second rotor (Ro2) rotatably provided at the inner peripheral side of the second stator St2.

The second inverter 32 is electrically connected to the second stator St2 and the battery 33. The second inverter 32 is connected to the control portion 40 and establishes communication therebetween. The second inverter 32 converts the DC current supplied from the battery 33 into the AC current by increasing the voltage based on the control signal from the control portion 40 and the converted AC current is supplied to the second stator St2 to generate the rotation drive force by the second motor/generator MG2 thereby the second motor/generator MG2 being used as a motor. The second inverter 32 controls the second motor/generator MG2 to function as a generator based on the control signal from the control portion 40 and the AC current generated at the second motor/generator MG2 is converted into the DC current and at the same time the voltage is decreased, thereby charging the battery 33.

The planetary gear mechanism 10 divides the rotation drive force of the engine EG into the first motor/generator MG1 side and a differential mechanism (DF) side, which will be explained later and is formed by a sun gear 11, a planetary gear 12, a carrier 13 and a ring gear 14. The sun gear 11 is connected to the first rotor Ro1 for unitary rotation therewith. The planetary gear 12 is provided at the periphery of the sun gear 11 with a plurality of numbers and engages with the sun gear 11. The carrier 13 rotatably (rotation) supports the plurality of planetary gears 12. The carrier 13 is connected to the input shaft 51 for unitary rotation therewith. The ring gear 14 is of ring shaped and is formed with a plurality of inner gears 14a at the inner peripheral surface thereof. An output gear 14b is provided at the outer peripheral surface of the ring gear 14. The plurality of inner gears 14a is in engagement with the plurality of planetary gears 12.

A reduction gear 60 is formed by a first gear 61, a second gear 62 and a connecting shaft 63. The first gear 61 is in engagement with the output gear 14b of the ring gear 14 and at the same time in engagement with an output gear 71 which unitary rotates with the second rotor Ro2. The second gear 62 is in connection with the first gear 61 through the connecting shaft 63 and rotates unitary with the first gear 61. It is noted that the second gear 62 has a diameter smaller than the diameter of the first gear 61 and the number of teeth of the second gear 62 is smaller than the number of the first gear 61. The second gear 62 is in engagement with the input gear 72.

The differential mechanism DF delivers the rotation drive force transmitted to the input gear 72 to drive shafts 75 and 76, which are respectively connected to the drive wheels Wl and Wr. As explained above, the input shaft 51 is rotatably connected to the drive wheels Wl and Wr through the planetary gear mechanism 10, the reduction gear 60, the differential mechanism DF and the drive axles 75 and 76. It is noted that no second clutch, formed separately from the clutch 20 exists between the engine EG and the clutch 20. Further, it is noted that no second clutch formed separately from the clutch 20 exists between the clutch 20 and the drive wheels Wl and Wr.

The control portion 40 centrally controls the hybrid drive device 100 and includes an ECU. The ECU is equipped with a memory portion formed by an input/output interface, CPU, RAM, ROM and non-volatile memory respectively connected with one another through bus lines. The CPU executes the program corresponding to the flowchart illustrated in FIGS. 3, 4, 5, 8, 9, 11 and 14. The RAM temporally memorizes variables necessary for executing the program. The memory portion memorizes the detected values from the various sensors and also memorizes the program. The control portion 40 may be formed by one single ECU or may be formed by a plurality of ECUs.

The control portion 40 obtains the information on acceleration opening degree Ac which indicates the absolute value of the operating amount of an acceleration pedal 81 detected by an acceleration sensor 82. The control portion 40 further obtains the vehicle wheel speeds Vr and Vl from the vehicle wheel sensors 85 and 86 which detect rotation speed of each of the vehicle wheels Wl and Wr (not necessarily be the drive wheels) and then the vehicle speed V can be calculated based on the obtained vehicle wheel speeds (Vr) and (Vl). The control portion 40 calculates the "required drive force" based on the acceleration opening degree Ac and the vehicle speed V. The control portion 40 obtains the information on brake opening degree Bk (Bk) which indicates the absolute value of the operating amount of a brake pedal 83 detected by a brake sensor 84. The control portion 40 calculates the "required braking force" based on the brake opening degree Bk. The control portion 40 calculates the input shaft rotation speed $\tilde{\omega}i$ which corresponds to the rotation speed of the input shaft 51 (carrier 13) based on the rotation speed $\tilde{\omega}MG1r$ of the first motor/generator MG1 inputted from the rotation speed sensor MG1-1, the rotation speed $\tilde{\omega}MG2r$ of the second motor/generator MG2 (calculated from the vehicle speed V) and the number of teeth between the sun gear 11 and the inner gear 14a.

(Explanation of Electric Running Mode and Split Running Mode)

Figure 2A:
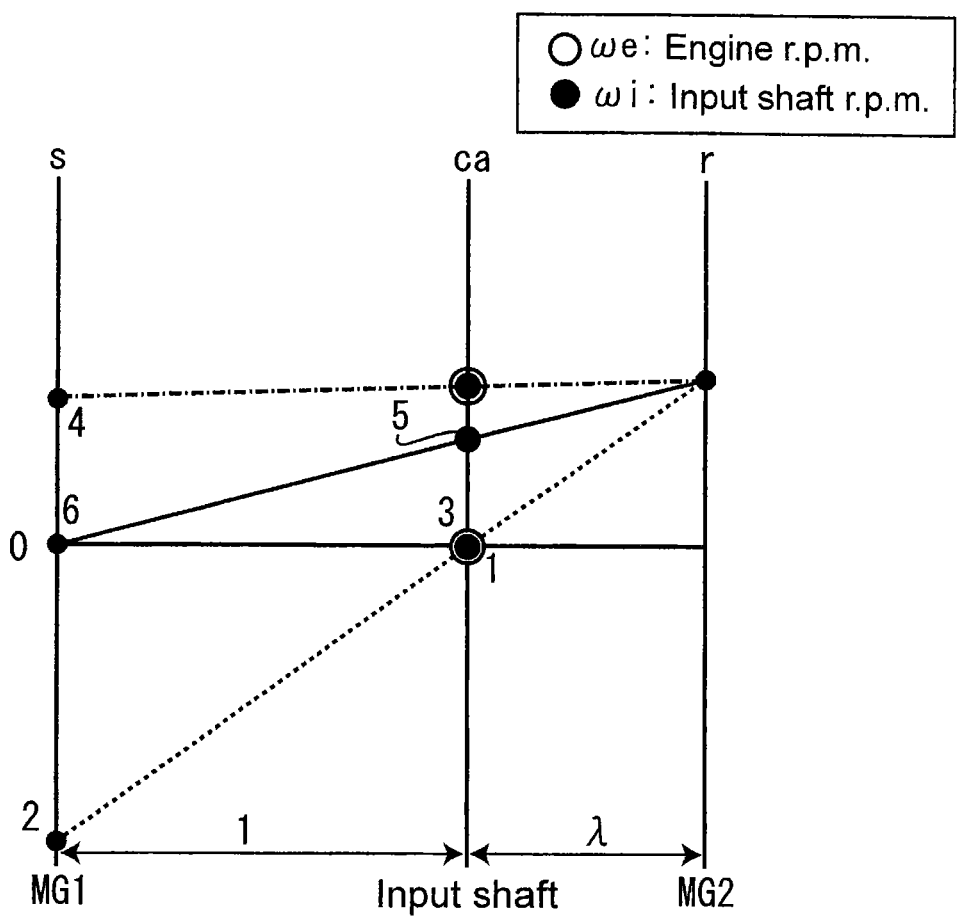
FIG. 2A is a velocity diagram of the planetary gear mechanism under electrically operated running mode and under hybrid running mode.
Figure 2B:
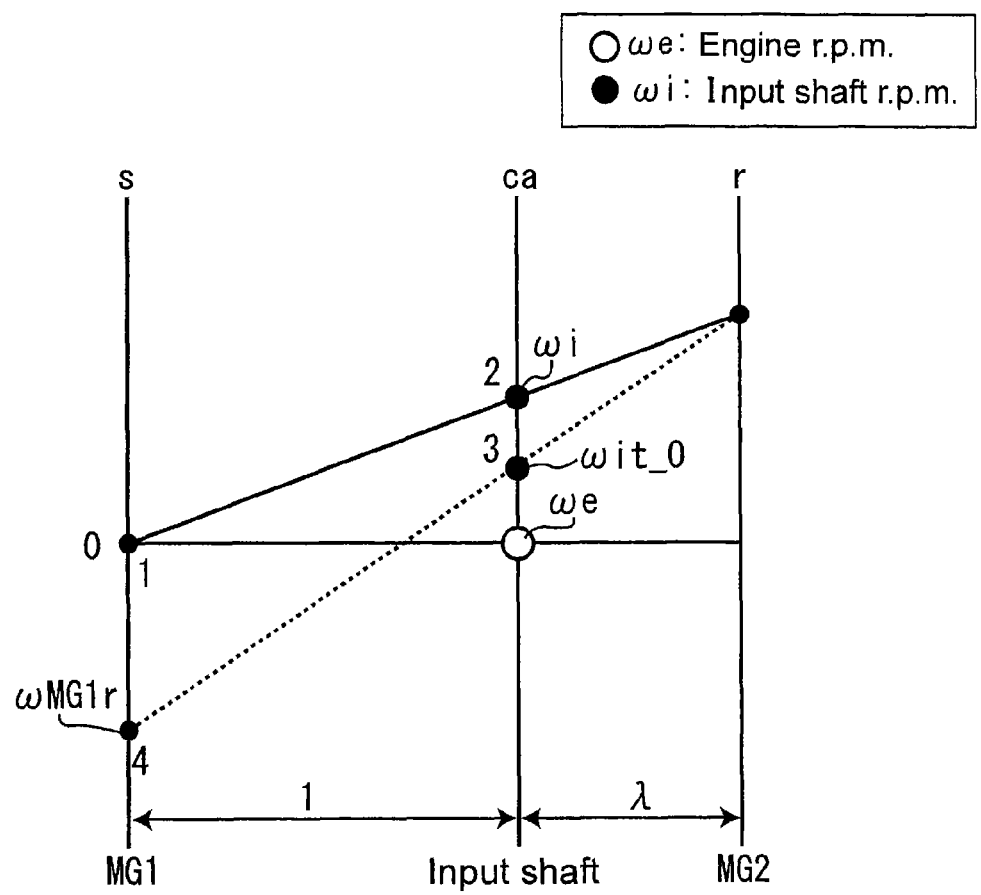
FIG. 2B is a velocity diagram of the planetary gear mechanism under electrically operated running mode and under hybrid running mode.

Next, using the velocity diagram illustrated in FIG. 2, the "Electric running mode" and the "Split running mode" will be explained. The vehicle is either in "electric running mode" or in "split running mode" and both modes are switchable during the vehicle in a running state. The "electric running mode" means the mode in which the vehicle is driven by the rotation drive force of at least one of the first and the second motor/generators MG1 and MG2, whereas the "split running mode" means the mode in which the vehicle is driven by the rotation drive force of at least one of the first and the second motor/generators MG1 and MG2 and the rotation drive force of the engine EG and the other of the first and the second motor/generators MG1 and MG2 generates electricity (under generation operation).

As shown in the diagram of FIG. 2, the vertical axis indicates the rotation speed of each rotation element. The area upper than the value zero in FIG. 2 indicates the area where the rotation is in a positive direction and the area lower than the value zero indicates the area where the rotation is in a negative direction. In FIG. 2, the symbol "s" indicates the rotation speed of the sun gear 11, "ca" indicates the rotation speed of the carrier 13 and "r" indicates the rotation speed of the ring gear 14. In other words, the symbol "s" indicates the rotation speed of the first motor/generator MG1, "ca" indicates the rotation speed of the input shaft 51 and "r" indicates the rotation speed proportional to the rotation speed of the second motor/generator MG2 and the rotation speed of the drive wheels Wl and Wr (vehicle speed). It is noted that when the clutch 20 is completely engaged, the rotation speed "ca" becomes the same speed as the rotation speed of the output shaft EG-1 of the engine EG. Assuming that the distance between the vertical lines "s" and "ca" is one (1), the distance between the vertical lines "ca" and "r" becomes the gear ratio "$\lambda$" of the planetary gear mechanism 10 (ratio of the number of teeth between the sun gear 11 and the inner gear 14a: the number of teeth of sun gear 11/the number of teeth of inner gear 14a). As explained, the first motor/generator MG1 (first rotor Ro1), the input shaft 51 and the second motor/generator MG2 are rotated mutually associated with one another.

Under the battery being in sufficiently charged state and the required drive force is sufficiently obtained from the rotation drive force from the first and the second motor/generators MG1 and MG2 only, the vehicle is driven under the "electric running mode".

Under the "electric running mode", when the vehicle is driven by the rotation drive force only from the second motor/generator MG2, the control portion 40 controls the actuator 50 to disconnect the clutch 20. Thus the engine EG and the input shaft 51 are disconnected. The control portion 40 sends the control signal to the second inverter 32 to drive the second motor/generator MG2 to generate the "required drive force". Under this state, as shown by the solid line in FIG. 2A, the second motor/generator MG2 rotates in the positive direction. The engine EG is stopped due to the disconnection from the input shaft 51 (the engine rotation speed $\tilde{\omega}e$ is zero) (the state of point "1" in FIG. 2A). When the vehicle is driven only by the rotation drive force of the second motor/generator MG2, the clutch 20 is in disconnected state, and therefore, the input shaft 51 is freely rotatable. (State of point "5" in FIG. 2A). Therefore, the rotation drive force from the second motor/generator MG2 transmitted to the ring gear 14 is idly rotated within the planetary gear mechanism 10 due to the free rotation of the input shaft 51. Thus, the first motor/generator MG1 does not rotate (the rotation speed $\tilde{\omega}MG1r$ is zero) (State of point "6" in FIG. 2A). Since the first motor/generator MG1 does not rotate, any rotation loss derived from the rotation of the first motor/generator MG1 (inertia torque of the first rotor Ro1) can be prevented to save electric energy (to improve electricity consumption of the vehicle).

When the vehicle is running under the "electric running mode" and the required drive force is not sufficient by the rotation drive force of the second motor/generator MG2 only, the control portion 40 outputs the control signal to the actuator 50 to engage the clutch 20 for establishing connection between the output shaft EG-1 and the input shaft 51. At the same time the control portion 40 outputs the control signal to the first and the second inverters 31 and 32 to drive the first and the second motor/generators MG1 and MG2 to obtain the required drive force for the vehicle. Under this state, as shown by the broken line in FIG. 2A, the first motor/generator MG1 is rotated in the negative direction (The state of point "2" in FIG. 2A) and the second motor/generator MG2 is rotated in the positive direction and the engine EG is stopped. (The state of point "3" in FIG. 2A). Under this state, the friction torque of the engine EG, which is a negative torque, functions as a reaction force receiver for supporting the carrier 13. Therefore, the maximum rotation drive force that the first motor/generator MG1 can output is limited to the rotation drive force that the rotation drive force transmitted to the input shaft 51 by the first motor/generator MG1 becomes equal to or less than the friction torque of the engine EG.

When the required drive force is not sufficient only by the rotation drive force generated by the first and the second motor/generators MG1 and MG2 or when the battery is not sufficiently charged, the vehicle is driven under the "split running mode".

Under the "split running mode", the control portion 40 controls the actuator 50 to actuate the clutch 20 to be in engagement state and at the same time the control portion 40 controls the engine EG to generate a predetermined rotation drive force. Thus, the engine EG and the input shaft 51 are connected and the engine rotation drive force is inputted to the carrier 13 and the engine rotation drive force transmitted to the carrier 13 is divided into two directions and transmitted to the sun gear 11 and the ring gear 14, respectively. Thus, the engine rotation drive force is delivered to the first motor/generator MG1 and the drive wheels Wr and Wl.

Under the "split running mode", the engine EG is maintained to a highly efficient state (high efficient state in fuel consumption ratio). Under this state, as shown by the chain line in FIG. 2A, the first motor/generator MG1 receives the divided rotation drive force from the engine EG and rotates in the positive direction (state of point "4" in FIG. 2A) and generates the electricity. Thus, the first motor/generator MG1 outputs a motor/generator torque in a negative direction to the sun gear 11. In other words, the first motor/generator MG1 functions as a reaction force receiver which supports the reaction force of engine torque TE. Accordingly, the rotation drive force of the engine EG is distributed to the ring gear 14 and eventually to the drive wheels Wl and Wr. The second motor/generator MG2 is driven by the electric current which the first motor/generator MG1 generates and the electric current which is supplied from the battery 33 to drive the drive wheels Wl and Wr.

It is noted here that when the control portion 40 judges that the acceleration pedal 81 has been released (acceleration opening degree "Ac" is zero) or judges that the brake pedal 83 has been depressed (the brake opening degree Bk is larger than zero), a regeneration braking operation is executed. Under the "regeneration braking" operation, the control portion 40 generally controls the actuator 50 to actuate the clutch 20 to be in a disconnected state. Then the control portion 40 outputs the control signal to the second inverter 32 and the regeneration braking force is generated at the second motor/generator MG2. At this timing, the second motor/generator MG2 generates the rotation drive force in a negative direction and the current generated at the second motor/generator MG2 is charged to the battery 33. Accordingly, the regeneration braking is executed when the clutch 20 is disconnected and the vehicle kinetic energy is not wastefully consumed due to the friction torque of the engine EG. It is noted that under the battery 33 being fully charged state, when the so-called engine brake is used in addition to the friction brake for generating the braking force, the control portion 40 controls the actuator 50 to actuate the clutch 20 to be brought into engagement state thereby rotating the engine EG to utilize the engine friction toque (so-called engine brake) for deceleration of the vehicle.

(Clutch Control)

Figure 3:
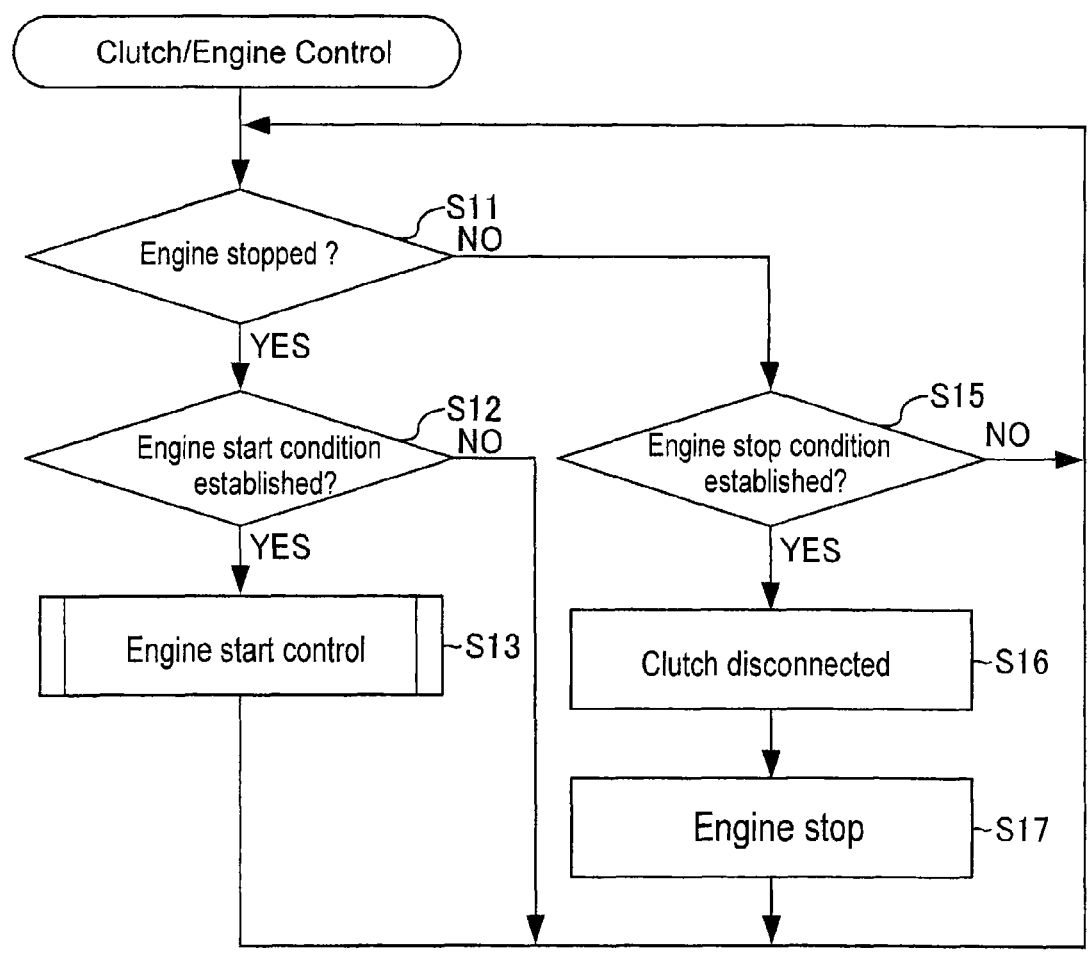
FIG. 3 is a flowchart of a program executed at the control portion illustrated in FIG. 1 for clutch engine control.

Hereinafter, the clutch control will be explained with reference to the flowchart shown in FIG. 3. When the vehicle is in a runnable state, at the step S11 and when the control portion 40 judged that the engine is stopped (S11: YES), the control portion 40 advances the program to the step S12 and judged that the engine is not stopped (S11: NO), the control portion advances the program to the step S15.

At the step S12, when the control portion 40 judged that the engine start condition has been established (S12: YES), the program goes to the step S13 and judged that the engine start condition has not been established (S12: NO), the control portion 40 returns the program to the step S11. It is noted that when the control portion 40 judged that the remaining amount of the battery 33 has dropped, or the required drive force is not sufficient by the generation by the first and the second motor/generators MG1 and MG2, the engine start condition is deemed to be established.

At the step S13, the control portion 40 starts execution of the engine start control. This engine start control will be explained later with reference to the flowchart in FIG. 4. After the processing of the step S13 finished, the program returns to the step S11.

At the step S15, when the control portion 40 judged that the engine EG stop condition has been established (S15: YES), the program goes to the step S16 and judged that the engine EG stop condition has not been established (S15: NO), the program returns to the step S11. It is noted that when the control portion 40 judges that the battery remaining amount is sufficient, or that the required drive force is sufficient by the generation by the first and the second motor/generators MG1 and MG2, or when the engine EG is stopped to perform the regeneration barking operation, the engine EG stop condition is deemed to be established.

At the step S16, the control portion 40 outputs the control signal to the actuator 50 to disconnect the clutch 20 and the program goes to the step S17. At the step S17, the control portion 40 outputs the control signal to the engine EG to stop the fuel injection by the fuel injection device and to stop igniting operation by the ignition device thereby to stop the engine EG. Then the program returns to the step S11.

(Engine Start Control)

The engine start control will be explained hereinafter with reference to the flowchart shown in FIG. 4. When the engine start control is initiated, at the step S61, the control portion 40 calculates the allowable clutch difference rotation speed $\Delta\tilde{\omega}\_0max$ at the start of engagement which corresponds to the allowable clutch 20 difference rotation speed at the start of the clutch 20 being engaged. It is noted here that the clutch 20 difference rotation speed means the difference in rotation speed between the rotation speed of the input shaft 51 and the engine rotation speed $\tilde{\omega}e$ (output shaft EG-1). Further, upon initiation of the engine start control, engine is stopped (engine rotation speed $\tilde{\omega}e$ being zero), the value of the allowable clutch difference rotation speed $\Delta\tilde{\omega}\_0max$ at the start of engagement represents the allowable clutch difference rotation speed $\tilde{\omega}i\_0max$ at the start of engagement which corresponds to the rotation speed of the input shaft 51 at the start of engagement.

The allowable clutch difference rotation speed calculation processing which is the sub-routine of the step S61 in FIG. 4 will be explained with reference to FIG. 5. When the allowable clutch difference rotation speed calculation processing is initiated, at the step S61-1, the clutch temperature Tcrt which corresponds to the current temperature of the friction member 22a is obtained. According to this embodiment, the clutch temperature Tcrt is the temperature of the friction member 22a. More specifically, the control portion 40 obtains the clutch temperature Tcrt which corresponds to the current temperature of the friction member 22a by estimation based on the housing inside temperature Th detected by the temperature sensor 26, integrated value of the heat generation amount of the friction member 22a and the integrated value of the heat dissipation amount of the friction member 22a and the clutch 20 as a whole. The heat generation amount of the friction member 22a is calculated by the clutch difference rotation speed $\Delta\tilde{\omega}r$ which corresponds to the difference rotation speed of the clutch 20 being in engagement (difference in rotation speed between the engine rotation speed toe and the input shaft rotation speed $\tilde{\omega}i$) and the clutch transmitting torque Tcr. After the processing at the step S61-1 finished, the program goes to the step S61-2.

At the step S61-2, the control portion 40 calculates the allowable clutch heat generation amount Qtmax which corresponds to the heat generation amount that is allowed when the clutch 20 is engaged. According to this embodiment, the heat generation amount allowable for the operation of the clutch 20 means the heat generation amount allowable at the friction member 22a. In detail, the allowable clutch heat generation amount Qtmax is obtained by substituting the clutch temperature Tcrt (temperature of the friction member 22a) obtained at the step S61-1 into the following formula (1): wherein:

$$Qtmax = K(Tmax - Tcrt) \quad (1)$$

Qtmax: allowable clutch heat generation amount
K: coefficient for converting the temperature difference into the heat generation amount at the clutch 20 (friction member 22a)
Tmax: clutch allowable temperature (allowable temperature of friction member 22a)
Tcrt: current clutch temperature (current friction member 22a temperature).

It is noted that the clutch allowable temperature Tmax is the temperature lower than the upper temperature limit by a predetermined value, i.e., lower than the temperature of the binder upper temperature limit by a predetermined value. When the step S61-2 finished, the program goes to the step S61-3.

At the step S61-3, the control portion 40 estimates the oil temperature of the engine EG based on the coolant temperature to of the engine EG detected by the water temperature sensor EG-3. Then the control portion 40 calculates the friction torque Te of the engine EG based on the oil temperature of the engine EG and advances the program to the step S61-4.

Figure 6:
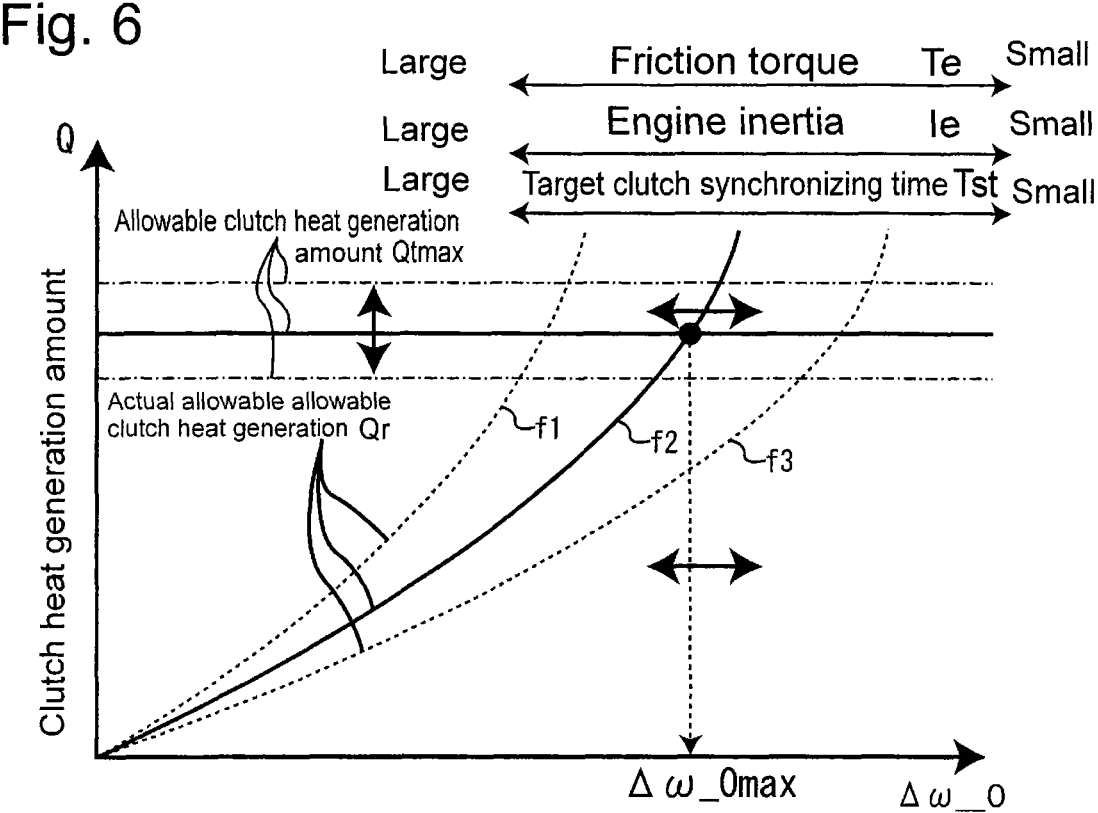
FIG. 6 is a graph, the vertical axis thereof indicating a clutch heat generation amount Q and the horizontal axis indicating a clutch difference rotation speed $\Delta\omega\_0$ at the start of engagement of the clutch and the graph shows the relationship between the allowable clutch heat generation amount Qtmax, actual clutch heat generation amount Qr and the clutch difference rotation speed $\Delta\omega\_0$ at the start of engagement of the clutch.

At the step S61-4, the control portion 40 calculates the relationship as a quadratic function between the clutch difference rotation speed $\Delta\tilde{\omega}\_0$ at the start of engagement and the actual clutch heat generation amount (Qr) by inputting the friction torque Te calculated at the step S61-3, engine inertia Ie and the target clutch synchronizing time Tst into the mapping data or the calculating formula which illustrates the relationship thereof with the friction torque of the engine EG, engine inertia, target clutch synchronizing time, actual clutch heat generation amount Qr and the clutch difference rotation speed $\Delta\tilde{\omega}$ (See FIG. 6). It is noted that the engine inertia Ie is an inertia moment of the various rotation members of the engine EG. The rotation members of the engine EG include crankshaft, con rod, piston, output shaft EG-1, flywheel 21, clutch cover 23, pressure plate 24 and diaphragm spring 25. The engine inertia is set in advance. The target clutch synchronizing time is an elapsed time from the start of engagement of the clutch to the completion of the synchronization of the output shaft EG-1 and the input shaft 51. The target clutch synchronizing time Tst is set in advance considering the shocks generated upon clutch engagement. The actual clutch heat generation amount Qr is the heat amount of the clutch 20 being in engagement and according to the embodiment, the heat generation amount of the friction member 22a under the clutch being in engagement. Since the engine EG is stopped upon the start of engagement of the clutch, the clutch difference rotation speed $\Delta\tilde{\omega}$ corresponds to the input rotation speed $\tilde{\omega}i$.

The clutch difference rotation speed $\Delta\tilde{\omega}$ under the clutch being in engagement is represented as the following formula (11):

$$\Delta\tilde{\omega} = -(\Delta\tilde{\omega}\_0/Tst) \times t + \Delta\tilde{\omega}\_0 \quad (11)$$

$\Delta\tilde{\omega}$: clutch difference rotation speed
Tst: target clutch synchronizing time
t: elapsed time of the clutch 20 from the start of engagement
$\Delta\tilde{\omega}\_0$: clutch difference rotation speed at the start of engagement of the clutch As shown above, when the clutch difference rotation speed $\Delta\tilde{\omega}$ under the clutch being in engagement is set as above formula (11), the relationship between the clutch difference rotation speed at the start of engagement of the clutch and the actual clutch heat generation amount Qr becomes the quadratic function as shown in FIG. 6.

It is noted that the mapping data or the calculation formula is set to be a quadratic function in which the actual heat generation amount Qr becomes large as the friction torque Te becomes large with respect to the relationship with the clutch difference rotation speed $\Delta\tilde{\omega}\_0$ at the start of engagement (the quadratic function becomes more in the quadratic function f1 side than in the quadratic function f3 side). Further, the mapping data or the calculation formula is set to be a quadratic function in which the actual heat generation amount Qr becomes large as the engine inertia Ie becomes large with respect to the relationship with the clutch difference rotation speed $\Delta\tilde{\omega}\_0$ at the start of engagement (the quadratic function becomes more in the quadratic function f1 side than in the quadratic function f3 side). Still further, the mapping data or the calculation formula is set to be a quadratic function in which the actual heat generation amount Qr becomes large as the target clutch synchronizing time Tst becomes large with respect to the relationship with the clutch difference rotation speed $\Delta\tilde{\omega}\_0$ at the start of engagement (the quadratic function becomes more in the quadratic function f1 side than in the quadratic function f3 side). After the processing of the step S61-4, the program goes to the step S61-5.

At the step S61-5, the control portion 40 calculates the allowable clutch difference rotation speed $\Delta\tilde{\omega}\_0max$ at the start of engagement based on the allowable clutch heat generation amount Qtmax calculated at the step S61-2 and the relationship between the clutch difference rotation speed $\Delta\tilde{\omega}\_0$ at the start of engagement and the actual heat generation amount. More specifically in FIG. 6, the allowable clutch difference rotation speed $\Delta\tilde{\omega}\_0max$ at the start of engagement is calculated from the intersection point between the allowable clutch heat generation amount Qtmax which is represented as the direct function and the relationship between the clutch difference rotation speed $\Delta\tilde{\omega}\_0$ at the start of engagement and the actual clutch heat generation amount Qr which is represented as the quadratic function.

At the step S61-5, the control portion 40 calculates the allowable clutch difference rotation speed $\Delta\tilde{\omega}max$ (bold broken line in FIG. 7) by substituting the allowable clutch difference rotation speed $\Delta\tilde{\omega}\_0max$ at the start of engagement, the target clutch synchronizing time Tst and the elapsed time "t" from the start of the clutch 20 engagement into the following formula (12):

$$\Delta\tilde{\omega}max = -(\Delta\tilde{\omega}\_0max/Tst) \times t + \Delta\tilde{\omega}\_0max \quad (12)$$

$\Delta\tilde{\omega}max$: allowable clutch difference rotation speed
$\Delta\tilde{\omega}\_0max$: allowable clutch difference rotation speed at the start of engagement
Tst: target clutch synchronizing time
"t": elapsed time from the start of engagement of the clutch 20.

Figure 4:
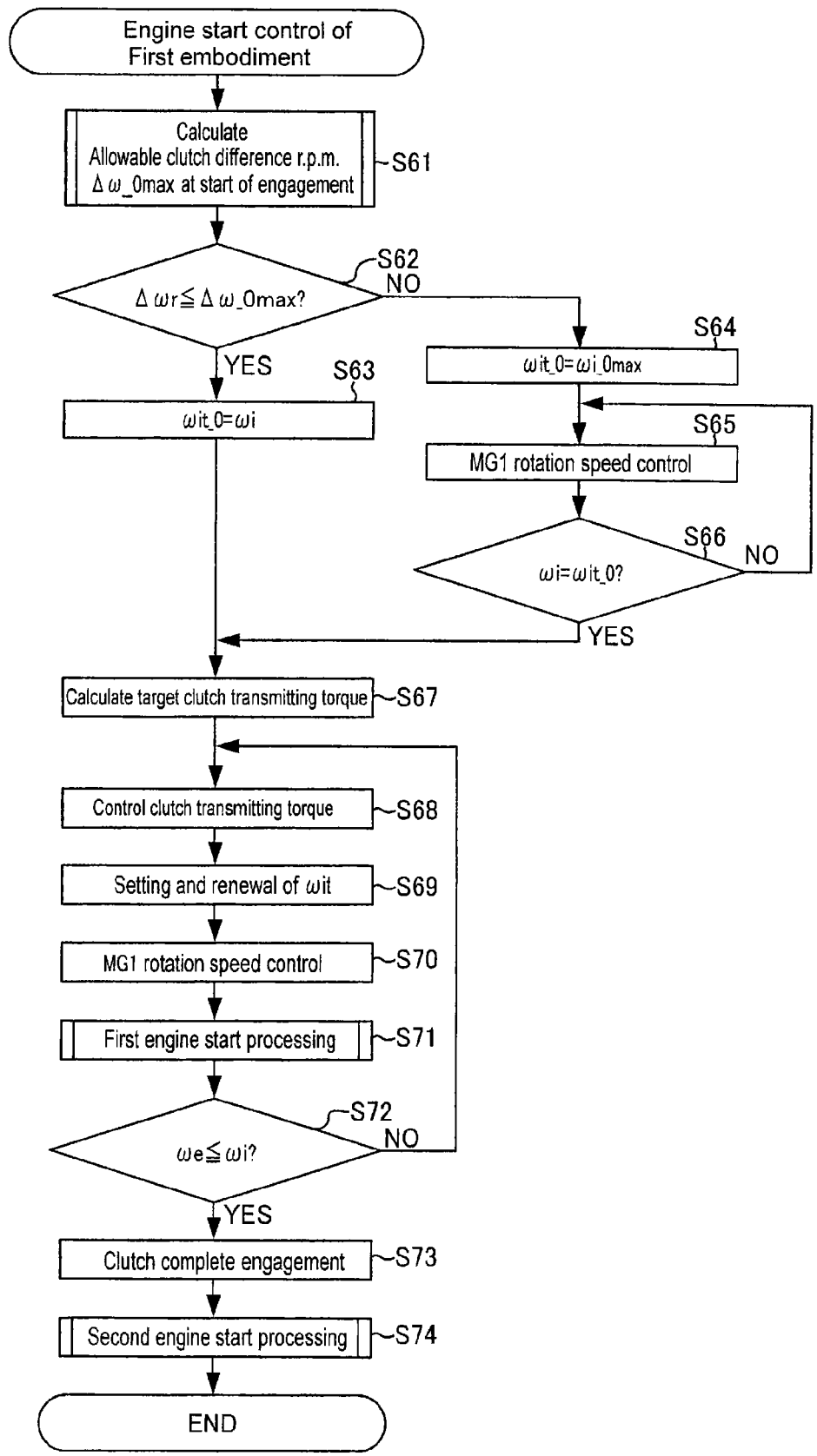
FIG. 4 is a flowchart of a program executed at the control portion illustrated in FIG. 1 for engine start control according to the first embodiment.

After the processing at the step S61-5, the allowable clutch difference rotation speed at the start of engagement calculation process ends (the process of the step S61 in FIG. 4 ends) and the program goes to the step S62 in FIG. 4.

At the step S62, when the control portion 40 judged that the current clutch difference rotation speed $\Delta\tilde{\omega}r$ is equal to or less than the allowable clutch difference rotation speed $\Delta\tilde{\omega}\_0max$ at the start of engagement (S62: YES), the program goes to the step S63 and when the control portion 40 judged that the current clutch difference rotation speed $\Delta\tilde{\omega}r$ is more than the allowable clutch difference rotation speed Δω̃_0max at the start of engagement (S62: NO), the program goes to the step S64. It is noted that the engine EG (output shaft EG-1) rotation speed is zero before the engine starts and accordingly, the current clutch difference rotation speed Δωr equals to the current input shaft rotation speed ωi.

At the step S63, the control portion 40 sets the current input shaft rotation speed ωi to the target input shaft rotation speed ω̃it_0 at the start of engagement and the program goes to the step S67.

At the step S64, the control portion 40 sets the allowable input shaft rotation speed ω̃i_0max at the start of engagement to the target input shaft rotation speed ω̃it_0 at the start of engagement. As explained above, the allowable input shaft rotation speed ω̃i_0max at the start of engagement is the same value as the allowable clutch difference rotation speed Δω̃_0max at the start of engagement. After the processing at the step S64 finished, the program goes to the step S65.

At the step S65, the control portion 40 outputs the control signal to the first inverter 31 and rotationally controls the rotation of the first motor/generator MG1 so that the input shaft rotation speed ωl becomes the target input shaft rotation speed ω̃it_0 at the start of engagement (allowable clutch difference rotation speed Δω̃_0max at the start of engagement). First, the control portion 40 calculates the target rotation speed ωMG1t of the first motor/generator MG1, in which the input shaft rotation speed ωi becomes the target input shaft rotation speed ω̃it_0 at the start of engagement which was set at the step S64. More specifically, the control portion 40 calculates the target rotation speed ωMG1t by substituting the target input shaft rotation speed ω̃it_0 at the start of engagement and the rotation speed ωr of the ring gear 14 into the following formula (2).

$$\omega MG1t = \{(\lambda+1) \times \omega it\_0 - \omega r\}/\lambda \qquad (2)$$

ωMG1t: target rotation speed of the first motor/generator MG1:

λ: gear ratio of the planetary gear mechanism 10 ((the number of teeth of the sun gear 11)/(the number of teeth of the inner gear 14a)):

ωit_0: target input shaft rotation speed at the start of engagement (rotation speed of the carrier 13):

ωr: the rotation speed of the ring gear 14.

It is noted that since the rotation speed ωr of the ring gear 14 is proportional to the vehicle speed V and the rotation speed of the second motor/generator MG2, the control portion 40 calculates the rotation speed ωr of the ring gear 14 based on the vehicle speed V and the rotation speed of the second motor/generator MG2. Or, alternatively the rotation speed ωr of the ring gear 14 may also be obtained by directly detecting the rotation speed ωr of the ring gear 14.

Next, the control portion 40 executes a PID control (feedback control) so that the rotation speed ωMG1r of the first motor/generator MG1 agrees with the above calculated target rotation speed ωMG1t by outputting a control signal to the first inverter 31 based on the rotation speed ωMG1r of the first motor/generator MG1 detected by the rotation speed sensor MG1-1. For example, as shown with the solid line in FIG. 2B, under the first motor/generator MG1 being stopped (rotation speed is zero), which is indicated at the point 1 in FIG. 2B, when the current input shaft rotation speed ω̃i (point 2 in FIG. 2B) is larger than the target input shaft rotation speed ω̃it_0 at the start of engagement (point 3 in FIG. 2B), the control portion 40 controls the rotation speed ωMG1r of the first motor/generator MG1 to the negative rotation side target rotation speed ωMG1t (point 4 in FIG. 2B) so that the rotation speed of the carrier 13 becomes the target input shaft rotation speed ω̃it_0 at the start of engagement (point 3 in FIG. 2B). Thus, the clutch 20 is controlled to the allowable clutch difference rotation speed Δω̃_0max at the start of engagement. After the processing at the step S65 finished, the program goes to the step S66.

At the step S66, when the control portion judged that the current input shaft rotation speed ωi is the target input shaft rotation speed ω̃it_0 at the start of engagement (S66: YES), the program goes to the step S67 and when the control portion 40 judged that the current input shaft rotation speed ωi is not the target input shaft rotation speed ω̃it_0 at the start of engagement (S66: NO), the program returns to the step S65.

At the step S67, the control portion 40 calculates the target clutch transmitting torque Tct which corresponds to the transmitting torque to be targeted under the clutch 20 being in engagement. More specifically, the control portion 40 calculates the target clutch transmitting torque Tct by substituting the engine friction torque Te calculated at the step S61-3, the engine inertia Ie, the target input shaft rotation speed ω̃it_0 at the start of engagement and the target clutch synchronizing time Tst into the following formula (3) below:

$$Tct = Te + Ie \cdot \omega it\_0 / Tst \qquad (3)$$

Tct: target clutch transmitting torque:

Te: friction torque of the engine EG:

Ie: engine inertia:

ωit_0: target input shaft rotation speed at the start of engagement (allowable clutch difference rotation speed at the start of engagement):

Tst: target clutch synchronizing time.

Using the formula (3) above, the target clutch transmitting torque Tct can be obtained wherein the engine EG rotation speed becomes the target input shaft rotation speed ωit_0 at the start of engagement after the target clutch synchronizing time Tst elapsed from the start of engagement of the clutch 20. After the processing at the step S67 finished, the program goes to the step S68.

At the step S68, by outputting a control signal to the actuator 50, the control portion 40 executes the feedback control so that the clutch transmitting torque generated at the clutch 20 becomes the target clutch transmitting torque Tct calculated at the step S67. It is noted that the control portion 40 calculates the clutch temperature Tcrt in a manner similar to the manner processed at the step S61-1 in FIG. 5 and calculates the friction force between the friction member 22a and the flywheel 21 and the pressure plate 24 based on the clutch temperature Tcrt, the difference rotation speed between the engine rotation speed ω̃e and the input shaft rotation speed ω̃i and the clutch pushing load. Then the control portion 40 controls the clutch transmitting torque by feedback control to output the control signal to the actuator 50 based on the change of the friction force. The clutch pushing load is a load received by the clutch disc 22 upon being pressurized by the flywheel 21 and the pressure plate 24 and the control portion 40 can confirm the clutch pushing load by the control signal outputted to the actuator 50.

Thus, the control portion 40 calculates the target clutch transmitting torque Tct based on the formula (3) above at the step S67 and at the step S68, by executing the above control, the engine EG rotation speed can be obtained as shown in the formula (4) below:

$$\tilde{\omega}e = \tilde{\omega}it\_0/Tst * t \qquad (4)$$

$\tilde{\omega}e$: engine EG rotation speed
$\tilde{\omega}it\_0$: target input shaft rotation speed at the start of engagement (equal to the allowable clutch difference rotation speed at the start of engagement)
Tst: target clutch synchronizing time
"t": elapsed time from the start of engagement of the clutch 20.

After the process of the step S68 finished, the program goes to the step S69.

At the step S69, the control portion 40 renews the target input shaft rotation speed $\tilde{\omega}it$ under the clutch 20 being in engagement by substituting the values of the target input shaft rotation speed $\tilde{\omega}it\_0$ at the start of engagement, the target clutch synchronizing time Tst, the elapsed time "t" elapsed from the start of engagement of the clutch 20, and current engine rotation speed $\tilde{\omega}e$ into the following formula (5):

$$\omega it = -\omega it\_0/Tst \cdot t + \omega e + \omega it\_0 \qquad (5)$$

$\omega it$: target input shaft rotation speed under the clutch 20 being in engagement:
$\omega it\_0$: target input shaft rotation speed at the start of engagement (allowable clutch difference rotation speed at the start of engagement):
Tst: target clutch synchronizing time:
t: elapsed time from the start of engagement of the clutch 20:
$\omega e$: engine rotation speed.

By using the formula (5) above, the target input shaft rotation speed $\omega it$ after renewal is calculated so that the clutch 20 is synchronized (state where the rotation difference is zero between the output shaft EG-1 and the input shaft 51) after the target clutch synchronizing time Tst elapsed from the start of engagement of the clutch. In other words, when the target input shaft rotation speed $\omega it\_0$ at the start of engagement is set at the step S64, the target input shaft rotation speed $\omega it$ under the clutch 20 being in engagement can be calculated according to the formula (5) above and accordingly, as the result as shown in FIG. 7 with the bold line, the relationship between the target clutch difference rotation speed $\Delta \omega t$ and the elapsed time "t" from the start of engagement of the clutch is represented as the direct function in which the target clutch difference rotation speed $\Delta \omega t$ gradually decreases as the elapsed time "t" increases.

Figure 7A:
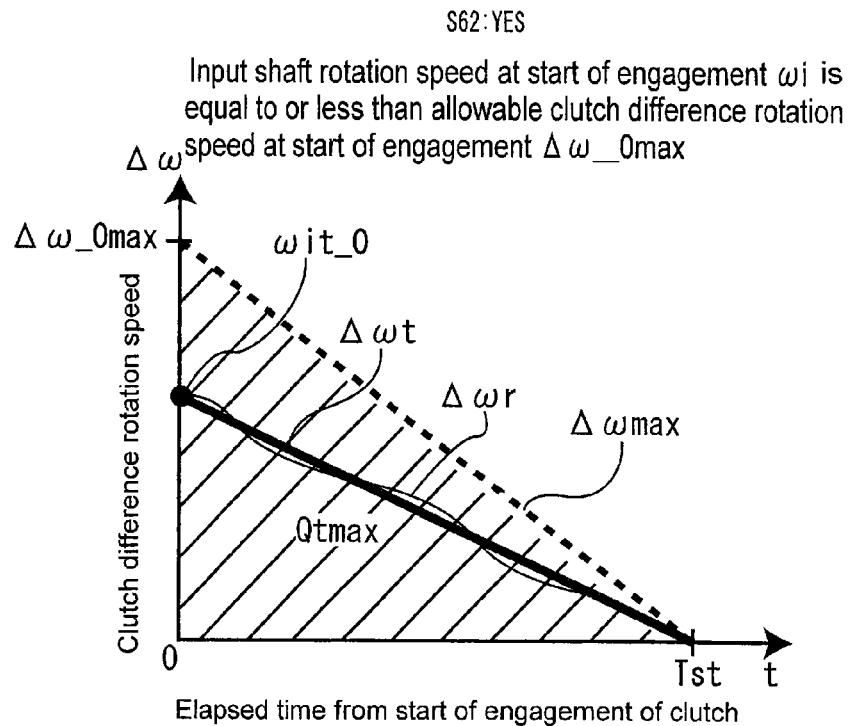
FIG. 7A is a graph, the horizontal axis thereof indicating the elapsed time "t" from the start of engagement of the clutch and the vertical axis thereof indicating the clutch difference rotation speed $\Delta\omega$, wherein the graph shows the relationship between the allowable clutch difference rotation speed $\Delta\omega max$ and the elapsed time "t" from the start of engagement of the clutch when the input shaft rotation speed at the start of engagement is equal to or less than the allowable clutch difference rotation speed at the start of engagement.
Figure 7B:
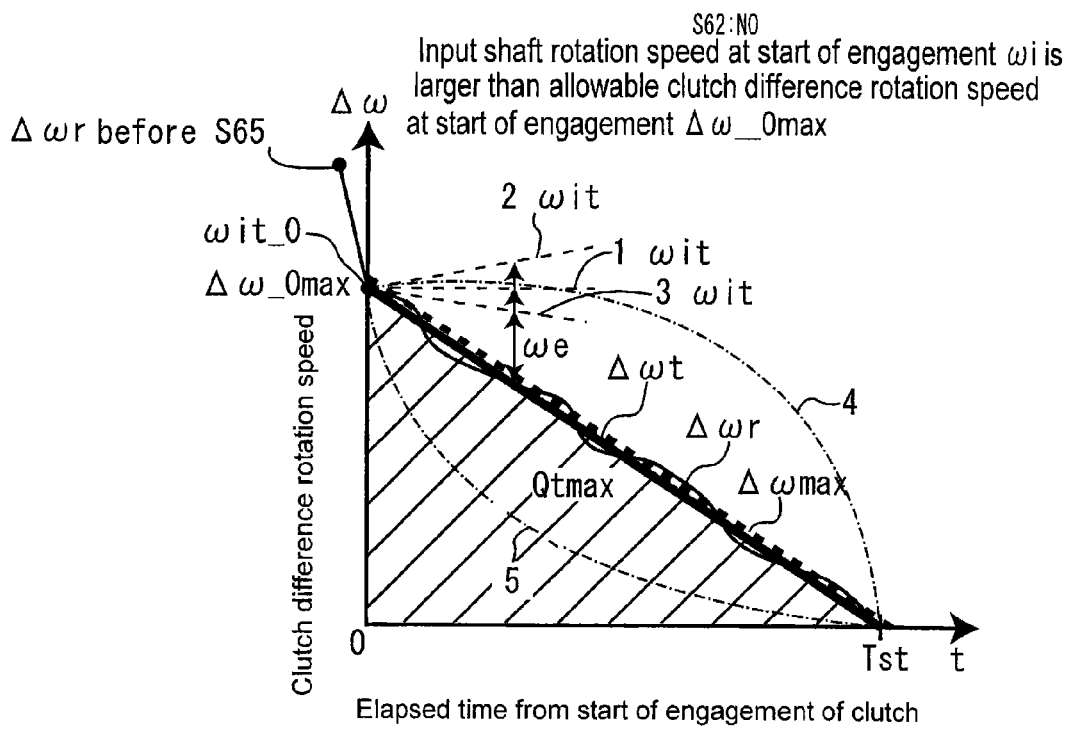
FIG. 7B is a graph, the horizontal axis thereof indicating the elapsed time "t" from the start of engagement of the clutch and the vertical axis thereof indicating the clutch difference rotation speed $\Delta\omega$, wherein the graph shows the relationship between the allowable clutch difference rotation speed $\Delta\omega max$ and the elapsed time "t" from the start of engagement of the clutch when the input shaft rotation speed at the start of engagement is larger than the allowable clutch difference rotation speed at the start of engagement.
Figure 8:
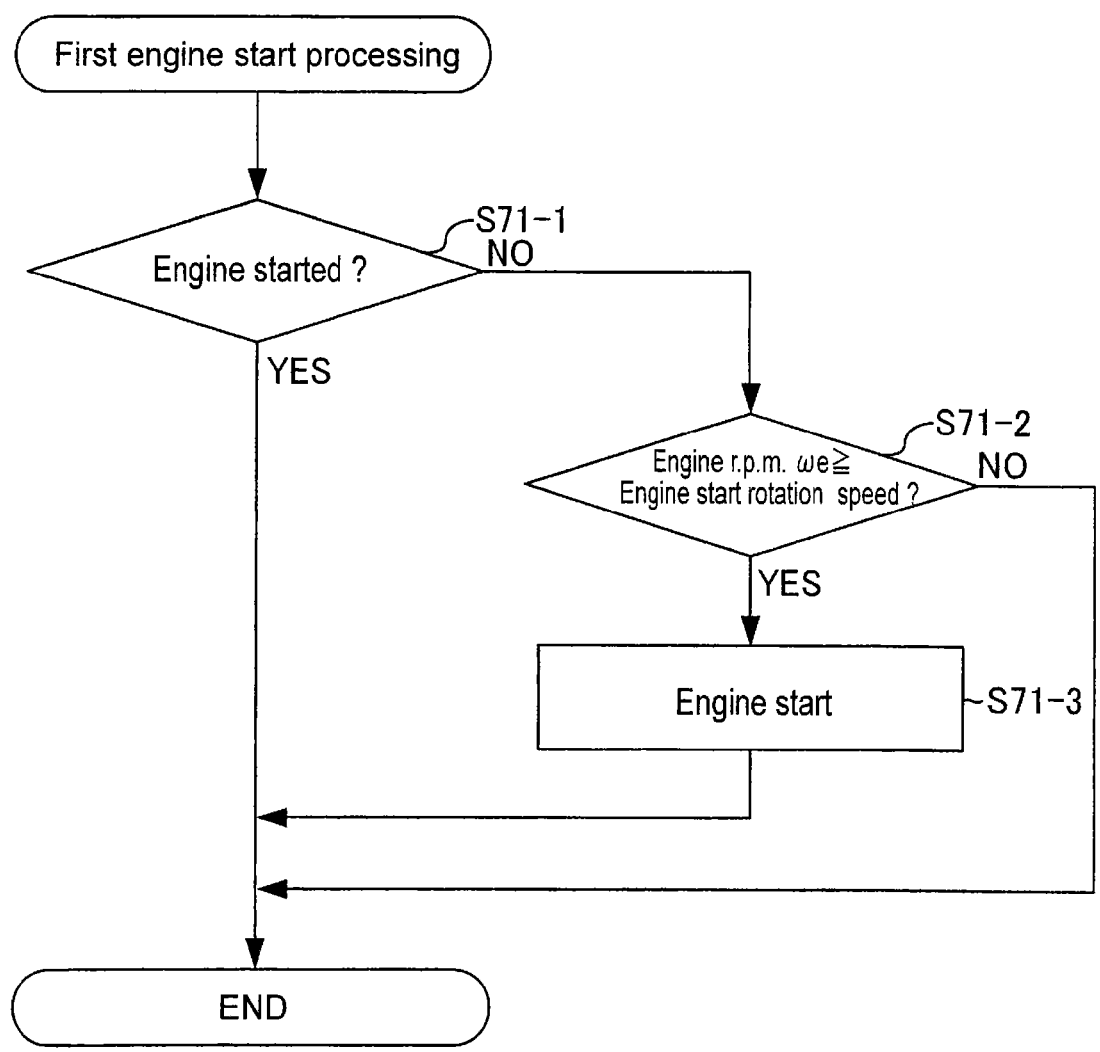
FIG. 8 is a flowchart of a control program executed at the control portion illustrated in FIG. 1 for a first engine start processing.
Figure 9:
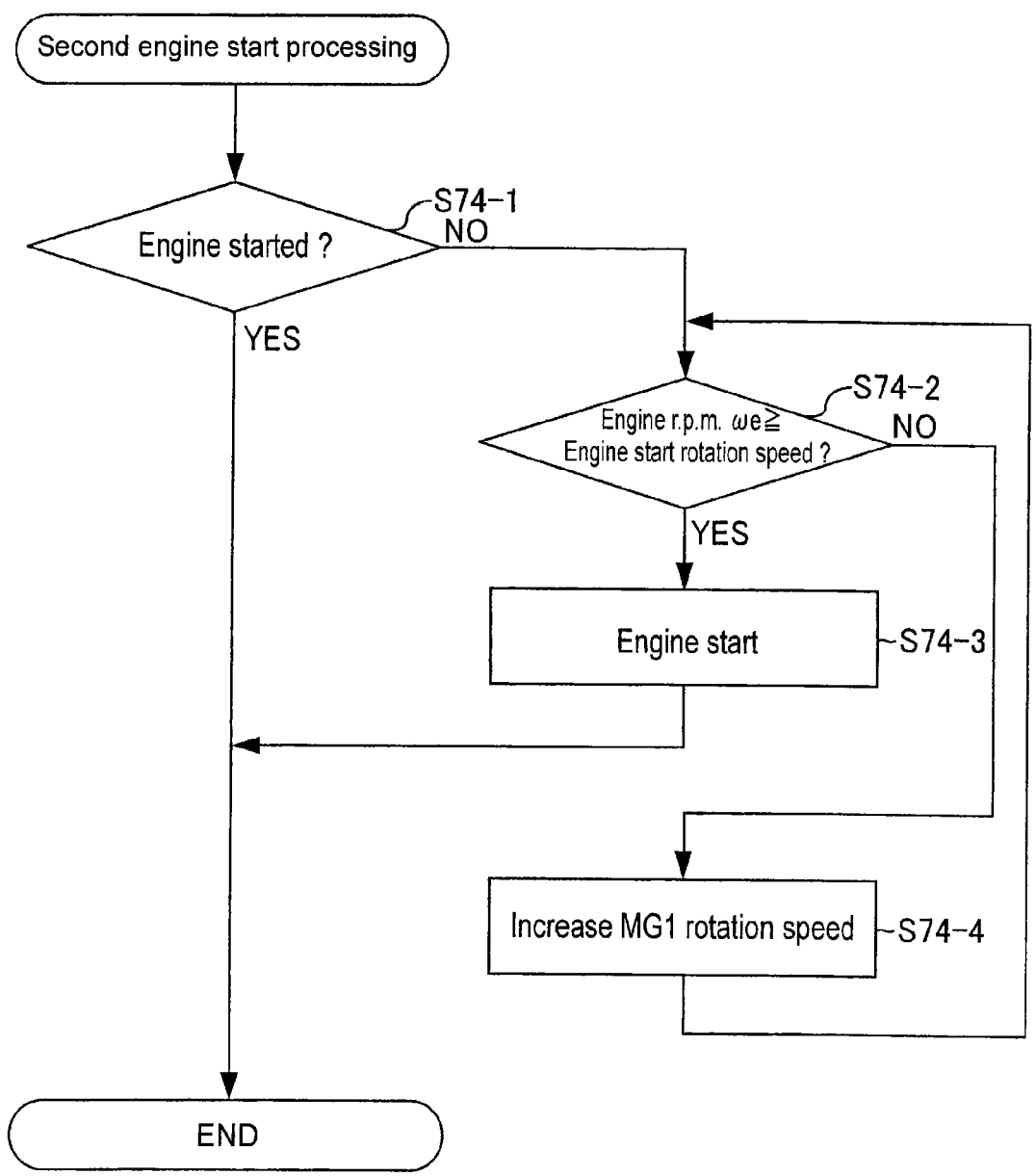
FIG. 9 is a flowchart of a control program executed at the control portion illustrated in FIG. 1 for a second engine start processing.

When the engine rotation speed $\tilde{\omega}e$ increases as intended from the start of engagement of the clutch as shown in the formula (4) above, the formula "$\tilde{\omega}it = \tilde{\omega}it\_0$" is established (See broken line (1) in FIG. 7B). On the other hand, when the engine rotation speed $\tilde{\omega}e$ increases faster than the intended increase from the start of engagement of the clutch as shown in the formula (4) above, the formula "$\tilde{\omega}it > \tilde{\omega}it\_0$" is established (See broken line (2) in FIG. 7B). Further, when the engine rotation speed $\tilde{\omega}e$ increases slower than the intended increase from the start of engagement of the clutch as shown in the formula (4) above, the formula "$\tilde{\omega}it < \tilde{\omega}it\_0$" is established (See broken line (3) in FIG. 7B). After the step S69 finished, the program goes to the step S70.

At the step S70, as similar to the manner executed at the step S65, the control portion 40 first calculates the target rotation speed $\tilde{\omega}MG1t$ of the first motor/generator MG1 in which the rotation speed of the carrier 13 becomes the target input shaft rotation speed $\tilde{\omega}it$ under being in engagement calculated at the step S69. Then the control portion 40 executes the feedback control (PID) so that the rotation speed $\tilde{\omega}MG1r$ of the first motor/generator MG1 becomes the above calculated target rotation speed $\tilde{\omega}MG1t$ by outputting the control signal to the first inverter 31 based on the rotation speed $\tilde{\omega}MG1r$ of the first motor/generator MG1 detected by the rotation speed sensor MG1-1. It is noted that the input shaft rotation speed $\tilde{\omega}i$ can be obtained by the following formula (6).

$$\tilde{\omega}i = (\lambda \times \tilde{\omega}MG1r + \tilde{\omega}r)/(1+\lambda) \qquad (6)$$

$\tilde{\omega}i$: input shaft rotation speed
$\lambda$: gear ratio of the planetary gear mechanism 10 (ratio of gear teeth between the sun gear 11 and the inner gear 14a: the number of teeth of the sun gear 11/the number of teeth of the inner gear 14a)
$\tilde{\omega}MG1r$: rotation speed $\tilde{\omega}MG1r$ of the first motor/generator MG1 (first rotor Ro1)
$\tilde{\omega}r$: rotation speed of the ring gear 14.

As explained, the input shaft rotation speed $\tilde{\omega}i$ can be represented as the formula (6) above and accordingly, when the vehicle speed which has a proportional relationship with the rotation speed of the ring gear 14 changes, the input shaft rotation speed $\tilde{\omega}i$ also changes. As the result, the actual heat generation amount Qr is supposed to be increased. However, the feedback control is executed at the step S70 to have the input shaft rotation speed $\tilde{\omega}i$ to be accorded with the target input shaft rotation speed $\tilde{\omega}it$. Thus the change of actual heat generation amount due to the change of the vehicle speed can be minimized or suppressed.

By this processing at the step S70, as shown in FIG. 7 with a fine line, the clutch difference rotation speed $\Delta \tilde{\omega}r$ gradually decreases along the bold line representing the target clutch difference rotation speed $\Delta \tilde{\omega}t$ in FIG. 7 with time from the start of engagement of the clutch 20. After the target clutch synchronizing time Tst elapsed, the value becomes zero to have the clutch 20 to be in synchronizing state. In other words, the relationship between the clutch difference rotation speed $\Delta \tilde{\omega}r$ and the elapsed time "t" from the start of engagement of the clutch is approximately a direct function in which the relationship decreases as the time "t" increases. After the step S70 finished, the program goes to the step S71.

At the step S71, the control portion 40 starts the first engine starting process. This first engine starting process will be explained with reference to the flowchart shown in FIG. 8. When the first engine start process is started and when the control portion 40 judges that the engine EG has already started at the step S71-1 (S71-1; YES), the first engine start process ends (process of the step S71 in FIG. 4 ends), then the program goes to the step S72 in FIG. 4 and when the control portion 40 judges that the engine EG has not started at the step S71-1 (S71-1; NO), the program goes to the step S71-2.

At the step S72-2, when the control portion 40 judges that the engine rotation speed $\omega e$ is judged to be equal to or more than an engine starting rotation speed which is necessary for starting the engine EG (S71-2; YES), the program goes to the step S71-3 and judged to be less than the engine starting rotation speed (S71-2; NO), the first engine start process ends (the process of step S71 of FIG. 4) and the program goes to the step S72 of FIG. 4.

At the step S71-3, the control portion 40 injects the fuel by the fuel injection device and at the same time ignites the plugs to start the engine EG. After the process of the step S71-3 ends, the first engine start process ends (the process of the step S71 in FIG. 4 ends) and the program goes to the step S72 of FIG. 4.

At the step S72, when the control portion 40 judges that the engine rotation speed ωe and the input shaft rotation speed ωi agree with each other (S72; YES), the program goes to the step S73 and when judged that both rotation speeds ωe and ωi do not agree with each other (S72; NO), the program returns to the step S68. It is noted that the state that the engine rotation speed ωe and the input shaft rotation speed ωi agree with each other is the state that the engine rotation speed ωe and the input shaft rotation speed ωi are in synchronization with each other and the state that the clutch 20 is synchronized.

At the step S73, the control portion 40 outputs a control signal to the actuator 50 to have the clutch 20 to be completely in engagement state. Thus the output shaft EG-1 and the input shaft 51 are completely connected. Then the program goes to the step S74.

At the step S74, the control portion 40 starts execution of the second engine start process. This second engine starting process will be explained with reference to the flowchart shown in FIG. 9. When the second engine start process is started and when the control portion 40 judges that the engine EG has started at the step S74-1 (S74-1; YES), the second engine start process ends (process of the step S74 in FIG. 4 ends) and at the same time the engine start control in FIG. 4 ends. When the control portion 40 judges that the engine EG has not started at the step S74-1 (S74-1; NO), the program goes to the step S74-2.

At the step S74-2, when the control portion 40 judges that the engine rotation speed ωe is judged to be equal to or more than the above explained engine starting rotation speed (S74-2; YES), the program goes to the step S74-3 and the engine rotation speed ωe is judged to be less than the engine starting rotation speed (S74-2; NO), the program goes to the step S74-4.

At the step S74-3, the control portion 40 injects the fuel by the fuel injection device and at the same time ignites the plugs to start the engine EG. After the process of the step S74-3 ends, the second engine start process ends (the process of the step S74 in FIG. 4 ends) and at the same time the engine start process in FIG. 4 ends.

At the step S74-4, the control portion 40 outputs a control signal to the first inverter 31 to increase the rotation speed ωMG1r of the first motor/generator MG1, thereby to increase the engine rotation speed ωe. After the process of the step S74-4, the program returns to the step S74-2.

When the engine EG starts, the control portion 40 outputs the control signal to the engine EG to generate a desired engine rotation drive force at the engine EG and at the same time outputs the control signal to the first inverter 31 to start electricity generation at the first motor/generator MG1. Under this state, the vehicle is driven under the split running mode.

Advantageous Effects of the Embodiment

Figure 11:
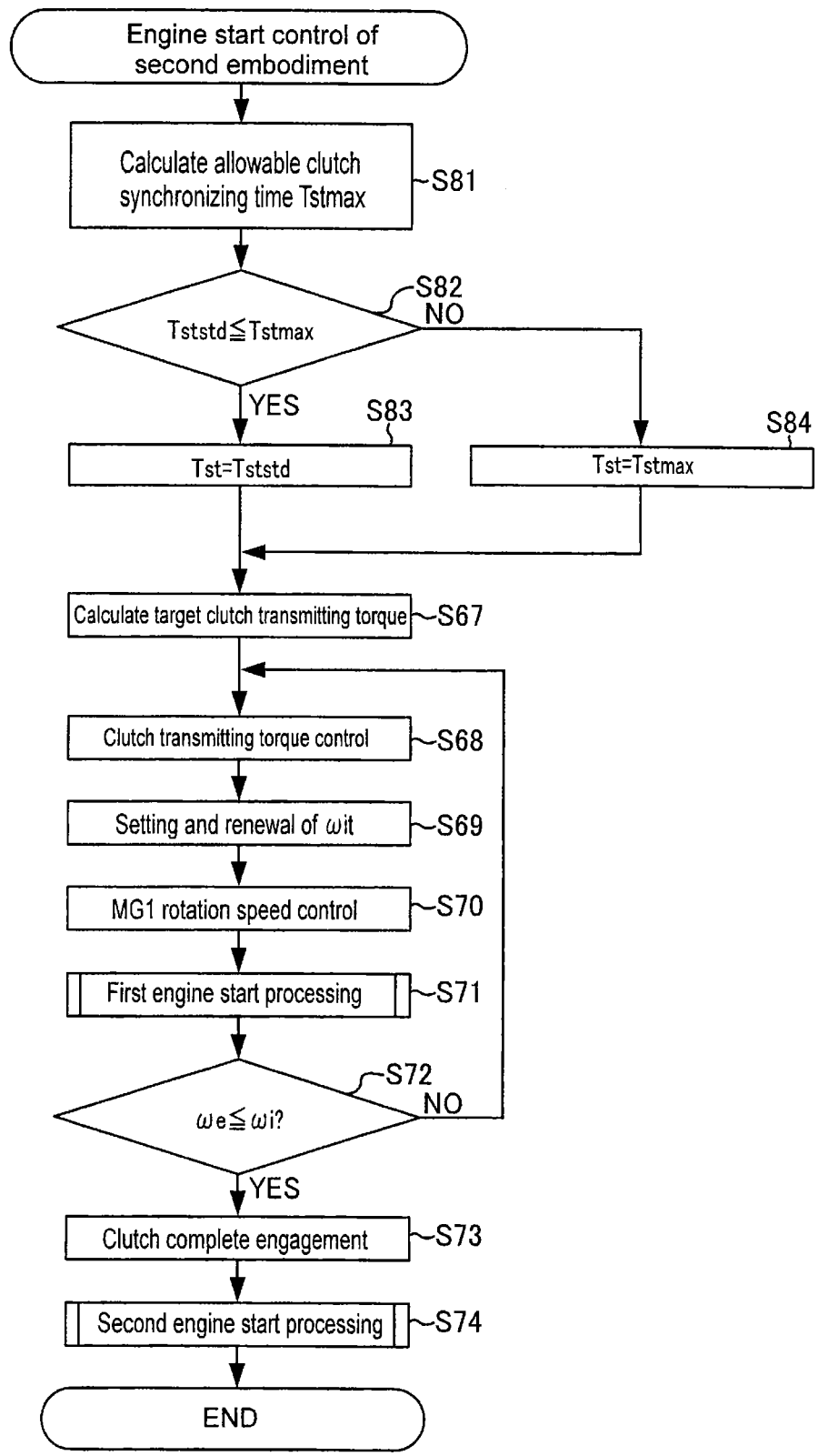
FIG. 11 is a flowchart of a control program executed at the control portion of FIG. 1 for the engine start control according to the second embodiment.
Figure 14:
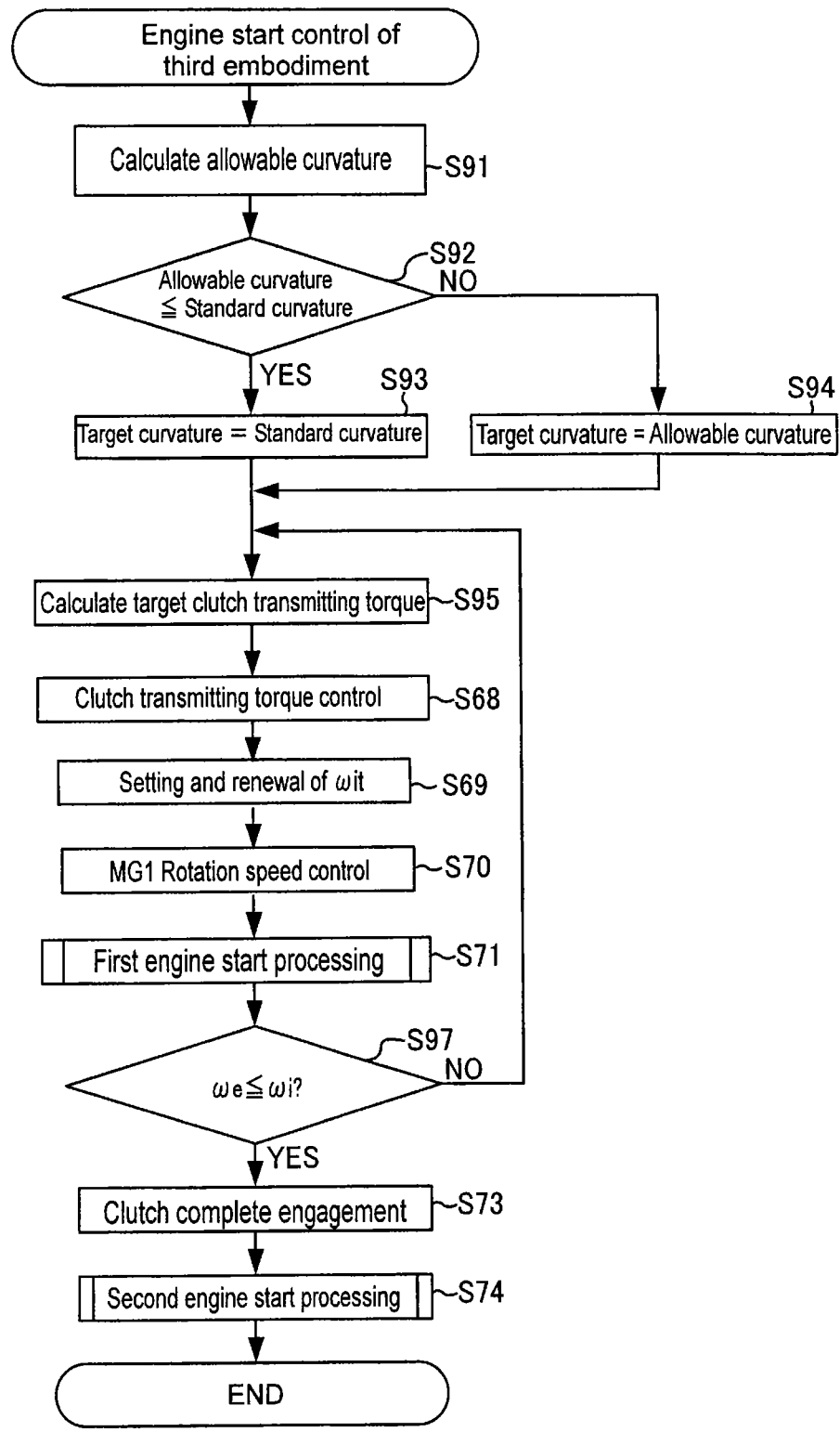
FIG. 14 is a flowchart of a control program executed at the control portion of FIG. 1 for the engine start control according to the third embodiment.

As explained above, at the step S61-2 in FIG. 5, the control portion 40 (allowable clutch heat generation amount calculating means) calculates the allowable clutch heat generation amount Qtmax and at the step S70 in FIGS. 4, 11 and 14, the control portion 40 (motor/generator rotation control means) controls the rotation speed of the first motor/generator MG1 so that the heat generation amount does not exceed the allowable clutch heat generation amount Qtmax. By this, the heat generation amount of the clutch 20 can be limited to the allowable clutch heat generation amount Qtmax or less. Thus, the overheating of the clutch 20 can be prevented from deterioration in life and the deterioration in performance quality of the clutch 20.

Figure 5:
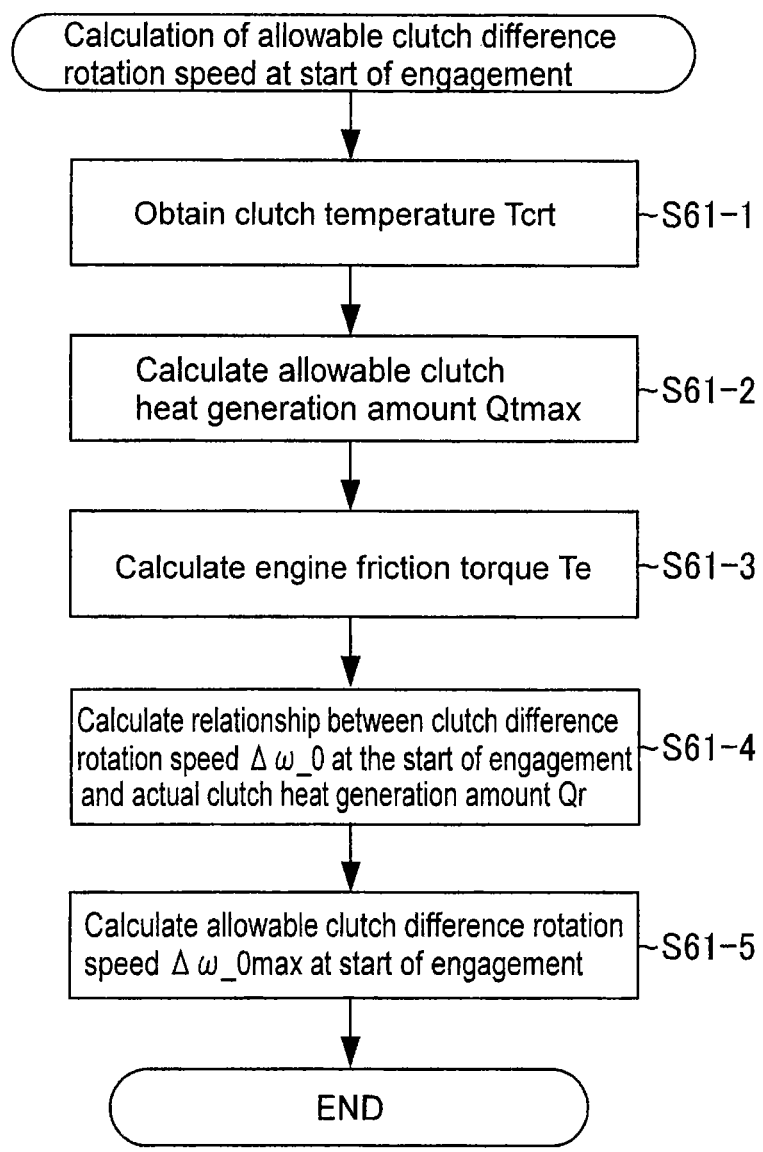
FIG. 5 is a flowchart of allowable clutch difference rotation speed at the start of engagement which is a subroutine of the control program executed at the control portion shown in FIG. 1.

Further, at the step S61-5 in FIG. 5, the control portion 40 (allowable clutch difference rotation speed calculating means) calculates the allowable clutch difference rotation speed Δωmax which is the difference in rotation speed between the output shaft EG-1 and the input shaft 51 based on the allowable clutch heat generation amount Qtmax. Then, at the step S70 in FIGS. 4, 11 and 14, the control portion 40 (motor/generator rotation control means) controls the rotation speed of the first motor/generator MG1 so that the clutch difference rotation speed Δωr which is the difference in rotation speed between the output shaft EG-1 and the input shaft 51 does not exceed the allowable clutch difference rotation speed Δωmax. By this, the change of the clutch difference rotation speed of the clutch 20 due to the vehicle speed change and the increase ratio of the engine rotation speed ωe can be prevented. Since the clutch difference rotation speed Δωr is controlled not to exceed the allowable clutch heat generation amount Qtmax, the heat generation amount of the clutch 20 can be surely limited to the allowable clutch heat generation amount Qtmax or less.

At the step S61-5 in FIG. 5, the control portion 40 (allowable clutch difference rotation speed calculating means) calculates the allowable clutch difference rotation speed Δω_0max at the start of engagement and at the step S65 in FIG. 4, the control portion 40 (motor/generator rotation control means) controls the rotation speed of the first motor/generator MG1 so that the clutch difference rotation speed Δω_0 at the start of engagement becomes equal to or less than the clutch difference rotation speed Δω_0max at the start of engagement. Thus, before the clutch is engaged, the clutch 20 difference rotation speed is controlled to be equal to or less than the allowable clutch difference rotation speed Δω_0max at the start of engagement which is calculated not to exceed the allowable clutch heat generation amount Qtmax. Accordingly, the heat generation amount of the clutch 20 can be surely prevented from exceeding the allowable clutch heat generation amount Qtmax under the clutch 20 being in engagement.

Since the clutch 20 starts engagement at the rotation speed less than the allowable clutch difference rotation speed Δω_0max at the start of engagement at which speed the clutch can start engagement, an engagement interruption due to an overheating of the clutch 20 during engagement can be prevented thereby to surely engage the clutch 20.

Further, at the step S65 in FIG. 4, the control portion 40 controls the rotation speed of the motor/generator MG1 so that the input shaft rotation speed ωi becomes the target input shaft rotation speed ωi_0 at the start of engagement (which is equal to the allowable clutch difference rotation speed Δω_0max at the start of engagement). Further, at the step S70 in FIG. 4, the control portion 40 controls the rotation speed ωMG1r of the first motor/generator MG1 to be the target input shaft rotation speed ωit under the clutch being in engagement. As stated, the clutch 20 is engaged keeping the high rotation speed of the input shaft 51 within a range that the clutch 20 does not overheat, the engine EG start is quickly performed preventing the clutch from overheating.

As shown in FIG. 7A, when the clutch difference rotation speed Δωr before the engagement starts is equal to or less than the allowable clutch difference rotation speed Δω_0max at the start of engagement (S62 in FIG. 4: YES), the clutch 20 is engaged, with keeping the current clutch difference rotation speed Δωr. Thus, after confirmation that the heat generation amount of the clutch 20 has not exceeded the allowable clutch heat generation amount Qtmax, at the time the clutch 20 starts engagement, the clutch 20 is engaged without executing control of the clutch difference rotation speed $\Delta\omega r$ by the first motor/generator MG1, keeping the current clutch difference rotation speed $\Delta\omega r$. Therefore, the engagement of the clutch 20 can be performed quickly and further the energy consumption consumed by the execution of the control of the clutch difference rotation speed $\Delta\omega r$ can be prevented.

Further at the step S69, the control portion 40 (target input shaft rotation speed calculating means) renews the target input shaft rotation speed $\omega it$ during the engagement based on the target input shaft rotation speed $\omega it\_0$ at the start of engagement (which is equal to the allowable clutch difference rotation speed $\Delta\omega\_0max$ at the start of engagement), engine rotation speed $\omega e$ and the target clutch synchronizing time Tst. At the step S70, the control portion 40 (motor/generator rotation control means) controls the rotation speed $\omega MG1r$ of the first motor/generator MG1 so that the rotation speed of the input shaft 51 during the clutch being in engagement becomes the target input shaft rotation speed $\omega it$ during engagement.

According to the embodiment, the control portion 40 (target input shaft rotation speed calculating means), using the formula (5) described above, calculates the target input shaft rotation speed $\omega it$ during the clutch engagement, the clutch 20 can be surely synchronized within the target clutch synchronizing time Tst and accordingly, the heat generation amount of the clutch 20 can be suppressed to the allowable clutch heat generation amount Qtmax or less to surely prevent overheating of the clutch 20. The advantages and the function thereof will be explained hereinafter in more detail.

The allowable clutch heat generation amount Qtmax is the value calculated by integrating a predetermined coefficient into the time integrated from the target clutch synchronizing time Tst of the target clutch difference rotation speed $\Delta\omega t$. This is illustrated with an area (shaded area) enclosed by the vertical axis, horizontal axis and the allowable clutch difference rotation speed $\Delta\omega max$ line in FIG. 7.

At the step S62, when the judgment is NO, as shown with the bold line in FIG. 7B, the target clutch difference rotation speed $\Delta\omega t$ is set so that the target clutch difference rotation speed $\Delta\omega t$ at the start of engagement of the clutch 20 becomes the allowable clutch difference rotation speed $\Delta\omega\_0max$ at the start of engagement and the target clutch difference rotation speed $\Delta\omega t$ during the engagement of the clutch 20 engagement gradually decreases with time from the start of engagement of the clutch 20 and after the target clutch synchronizing time Tst, becomes zero. In other words, as shown with the bold line in FIG. 7, the relationship between the target clutch difference rotation speed $\Delta\omega t$ and the elapsed time "t" elapsed from the start of the clutch 20 engagement is a direct function in which the target clutch difference rotation speed $\Delta\omega t$ gradually decreases as the elapsed time "t" increases.

At the step S70 in FIG. 4, the control portion 40 (motor/generator rotation control means) controls the rotation speed $\omega MG1r$ of the first motor/generator MG1 so that the rotation speed of the input shaft 51 during clutch 20 being in engagement becomes the target input shaft rotation speed $\omega it$. Therefore, even the engine EG rotation speed did not raise as intended according to the formula (4) above, or even the vehicle speed V is changed, as shown with the fine line in FIG. 7, the clutch difference rotation speed $\Delta\omega r$ gradually decreases with time from the start of engagement of the clutch 20 and becomes zero after the target clutch synchronizing time Tst elapsed. In other words, as shown with the fine line in FIG. 7, the relationship between the clutch difference rotation speed $\Delta\omega r$ and the elapsed time "t" elapsed from the start of the clutch 20 engagement is approximately a direct function in which the clutch difference rotation speed $\Delta\omega r$ gradually decreases as the elapsed time "t" increases. Thus, the heat amount generated at the clutch 20 under engagement can be surely suppressed to the allowable clutch heat generation amount Qtmax (shaded area in FIG. 7).

On the other hand, as shown with the chain line, the heat generation amount at the time the clutch 20 is engaged exceeds the allowable clutch heat generation amount Qtmax (shaded area in FIG. 7), in case the clutch difference rotation speed $\Delta\omega r$ does not drop after a certain time elapsed from the start of engagement of the clutch. Further, as shown with the chain line 5 in FIG. 7B, the vehicle shock may be generated due to a sudden drop of the clutch difference rotation speed $\Delta\omega r$ immediately after the start of engagement of the clutch 20. According to this embodiment, since the clutch difference rotation speed $\Delta\omega r$ is controlled to agree with the fine line in FIG. 7, the heat generation amount of the clutch 20 at the engagement can be suppressed to the allowable clutch heat generation amount Qtmax and accordingly the generation of the vehicle shock can be prevented.

As shown with the bold broken line in FIG. 7, the relationship between the allowable clutch difference rotation speed $\Delta\omega max$ and the elapsed time "t" from the start of engagement of the clutch 20 is a direct function in which the allowable clutch difference rotation speed $\Delta\omega max$ gradually decreases as the elapsed time "t" increases. Accordingly, at the step S61-5, the allowable clutch difference rotation speed $\Delta\omega\_0max$ at the start of engagement can be surely and easily calculated.

Further, at the step S61-2 in FIG. 5, the control portion 40 (allowable clutch heat generation amount calculating means) calculates the allowable clutch heat generation amount Qtmax based on the current clutch temperature Tcrt (temperature of the friction member 22a) and the clutch allowable temperature Tmax which corresponds to the temperature allowable for the clutch 20 (friction member 22a). Thus, regardless of the current temperature of the clutch 20, the temperature of the clutch 20 would not exceed the clutch allowable temperature Tmax at the clutch engagement time. Accordingly, overheating of the clutch 20 can be surely prevented. In other words, since the friction member 22a keeps the temperature lower than the heat resistance temperature of the friction member 22a, overheating of the friction member 22a can be also prevented. Still further, since the allowable clutch heat generation amount Qtmax can be confirmed, the dropping amount of the input shaft rotation speed $\omega i$ at the steps S64 through S66 in FIG. 4 can be minimized, and the clutch 20 can quickly enter into the engagement operation (S67 and S68 in FIG. 4). Further, a wasted energy consumption derived from the extra driving operation of the first motor/generator MG1 can be prevented.

At the step S61-4 in FIG. 5, the control portion 40 (allowable clutch difference rotation speed calculating means) calculates the relationship between the clutch difference rotation speed $\Delta\omega\_0$ at the start of engagement and the actual clutch heat generation amount Qr which relationship is a quadratic function as shown in FIG. 6, based on the friction torque Te of the engine EG, engine inertia Ie and the target clutch synchronizing time Tst. At the step S61-5 in FIG. 5, the control portion 40 calculates the allowable clutch difference rotation speed $\Delta\omega\_0max$ at the start of engagement (rotation speed at the intersection point shown in FIG.

6) based on the allowable clutch heat generation amount Qtmax and the relationship between the clutch difference rotation speed $\Delta\tilde{\omega}\_0$ at the start of engagement and the actual clutch heat generation amount Qr.

As explained, since the allowable clutch difference rotation speed $\Delta\tilde{\omega}\_0max$ at the start of engagement is calculated and the allowable clutch difference rotation speed $\Delta\tilde{\omega}max$ is set considering the values of the engine friction torque, engine inertia Ie and the target clutch synchronizing time Tst, the heat generation amount of the clutch 20 (friction member 22a) can be surely limited to the allowable clutch heat generation amount Qtmax regardless of the values of the values of the engine friction torque, the engine inertia Ie and the target clutch synchronizing time Tst. Further, preventing the clutch 20 from overheating, the clutch 20 can be engaged within the target clutch synchronizing time Tst to complete the clutch engagement quickly.

Further, interruption of engagement operation of the clutch 20 due to overheating during the engagement performance of the clutch 20 can be prevented. Further, if the temperature of the clutch 20 has already reached to the allowable temperature, the allowable clutch difference rotation speed $\Delta\tilde{\omega}\_0max$ at the start of engagement is calculated and the first motor/generator MG1 is controlled so that the clutch difference rotation speed $\Delta\tilde{\omega}$ becomes zero and the clutch 20 is engaged. Under the above control situation, without any further control processing, the above control is executed automatically.

At the step S67 in FIG. 4, the control portion 40 (target clutch transmitting torque calculating means) calculates the target clutch transmitting torque Tct by substituting the target input shaft rotation speed $\tilde{\omega}it\_0$ at the start of engagement, engine EG friction torque Te, engine inertia Ie and the target clutch synchronizing time Tst into the above formula (3). Then at the step S68 in FIG. 4, the control portion 40 (clutch control means) controls the clutch 20 so that the clutch transmitting torque during engagement of the clutch 20 becomes the target clutch transmitting torque Tct. Thus, the clutch transmitting torque is stable and constant when the clutch 20 is engaged. It is noted that the heat generation amount of the clutch 20 depends on the transmitting torque and as stated above, since the clutch 20 transmitting torque is constant at the engagement of the clutch 20, the clutch heat generation amount can be suppressed to the allowable clutch heat generation amount Qtmax which is set in advance by estimation.

Second Embodiment

Figure 12:
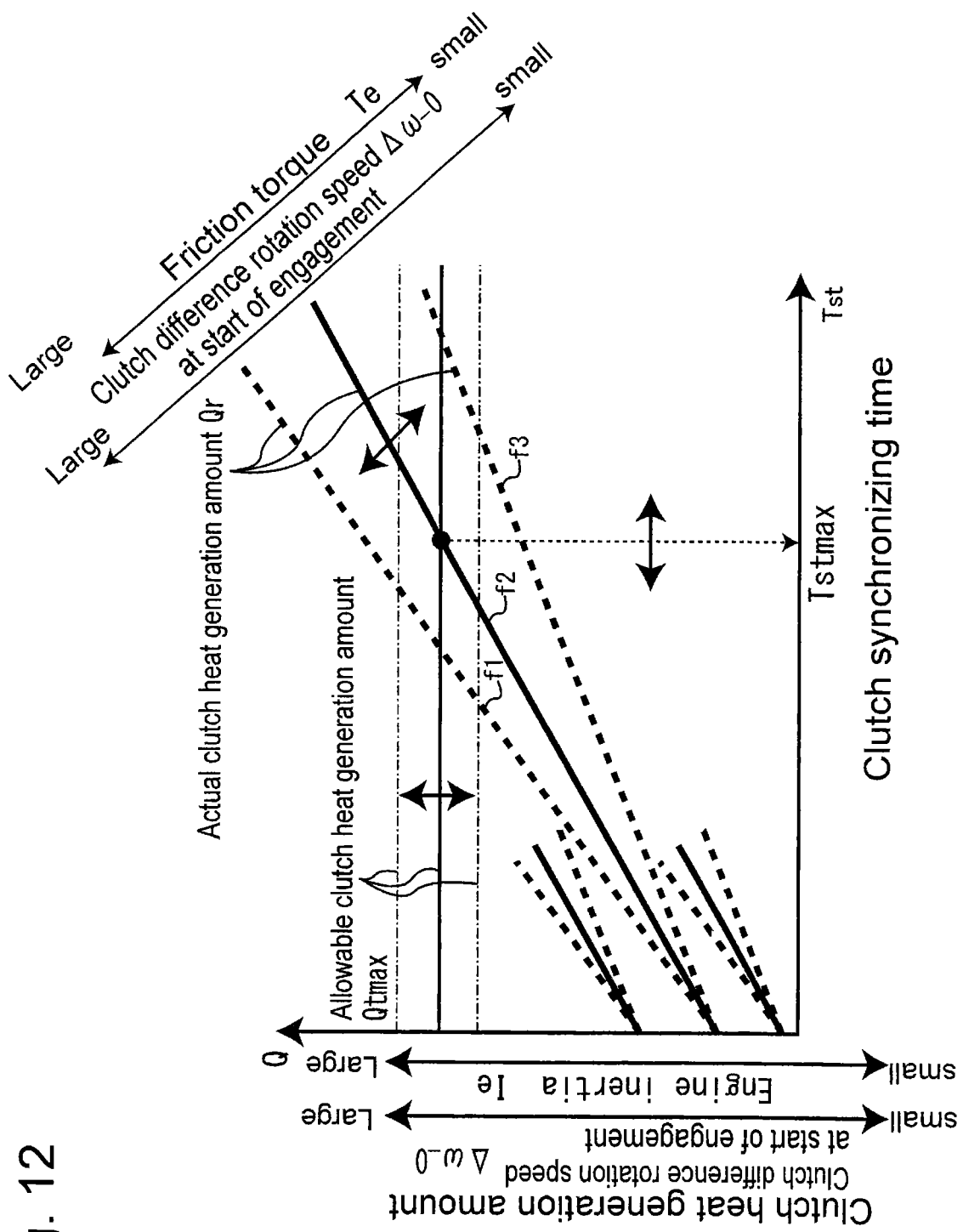
FIG. 12 is a graph, the vertical axis thereof indicating the clutch heat generation amount Q and the horizontal axis thereof indicating the clutch synchronizing time Tst, wherein the graph shows the relationship between the allowable clutch heat generation amount Qtmax and the actual clutch heat generation amount Qr and the clutch synchronizing time Tst.

The hybrid drive device according to the second embodiment will be explained hereinafter with reference to FIGS. 10 through 12, explaining the different points from those in the first embodiment. According to the second embodiment, as shown in FIG. 10, the control portion 40 variably controls the target clutch synchronizing time Tst so that the heat generation amount during the clutch 20 being in engagement becomes equal to or less than the allowable clutch heat generation amount Qtmax.

The engine start control according to the second embodiment will be explained hereinafter with reference to the flowchart of FIG. 11. When the engine start control according to the second embodiment begins, at the step S81, the control portion 40 calculates the allowable clutch synchronizing time Tstmax. More specifically, the allowable clutch heat generation amount Qtmax is calculated according to the same manner as explained in the step S61-1 and the step S61-2 in FIG. 5. Similarly the control portion 40 calculates the engine EG friction torque Te by the same way as explained in the step S61-3 in FIG. 5 above.

Then the control portion 40 calculates the relationship between the clutch synchronizing time Tst and the actual clutch heat generation amount Qr (See FIG. 12) inputting the engine EG friction torque Te, clutch difference rotation speed $\Delta\tilde{\omega}\_0$ at the start of engagement, engine inertia Ie into the mapping data or the calculating formula which illustrates the relationship thereof with the friction torque Te of the engine EG, clutch difference rotation speed $\Delta\tilde{\omega}\_0$ at the start of engagement, engine inertia Ie, actual clutch heat generation amount Qr and the clutch synchronizing time Tst. It is noted that since the engine EG is stopped at the start of the clutch 20 engagement, the value of the clutch difference rotation speed $\Delta\tilde{\omega}\_0$ at the start of engagement is the value of the input shaft rotation speed $\tilde{\omega}i\_0$ at the start of engagement of the clutch 20. The control portion 40 inputs the current input shaft rotation speed $\tilde{\omega}i$ as the clutch difference rotation speed $\Delta\tilde{\omega}\_0$ at the start of engagement into the mapping data or the calculation formula. It is noted that when the clutch difference rotation speed $\Delta\tilde{\omega}$ is set according to the formula (11) above, the relationship between the clutch synchronizing time Tst and the actual clutch heat generation amount Qr becomes the direct function as shown in FIG. 12.

It is noted that the mapping data or the calculation formula is set to be a direct function in which the actual heat generation amount Qr becomes large as the friction torque Te becomes large in the relationship with the clutch synchronizing time Tst (the direct function becomes more in the direct function f1 side than in the direct function f3 side). Further, the mapping data or the calculation formula is set to be a direct function in which the actual heat generation amount Qr becomes large as the clutch difference rotation speed $\Delta\tilde{\omega}\_0$ at the start of engagement becomes large with respect to the relationship with the clutch synchronizing time Tst (the direct function becomes more in the direct function f1 side than in the direct function f3 side). Still further, assuming that the clutch synchronizing time Tst is set to be the x-axis and the actual clutch heat generation amount Qr is set to be the y-axis, the y-segment of the direct function becomes large as the engine inertia Ie becomes large according to the mapping data or the calculation formula. Further, in the mapping data or the calculation formula, when the clutch difference rotation speed $\Delta\tilde{\omega}\_0$ at the start of engagement becomes large as the y-segment of the direct function becomes large.

The control portion 40 calculates the allowable clutch synchronizing time Tstmax based on the allowable clutch heat generation amount Qtmax calculated above and the relationship between the clutch synchronizing time Tst calculated above and the actual clutch heat generation amount Qr, which is represented by a direct function. More specifically, as shown in FIG. 12, the allowable clutch synchronizing time Tstmax is calculated from the intersection point between the allowable clutch heat generation amount Qtmax which is represented as a direct function and the relationship between clutch synchronizing time Tst and the actual clutch heat generation amount Qr which is represented as a direct function. After the processing of step S81, the program goes to the step S82.

At the step S81, the control portion 40 calculates the allowable clutch difference rotation speed $\Delta\tilde{\omega}max$ by substituting the clutch difference rotation speed $\Delta\tilde{\omega}\_0$ at the start of engagement, calculated allowable clutch synchronizing time Tstmax and the elapsed time "t" elapsed from the start of engagement of the clutch 20 into the following formula (14). (Bold broken line in FIG. 10).

$$\Delta\tilde{\omega}max = -(\Delta\tilde{\omega}\_0Tstmax) \times t + \Delta\tilde{\omega}\_0 \qquad (14)$$

Δω̃max: allowable clutch difference rotation speed
Δω̃_0: clutch difference rotation speed at the start of engagement
Tstmax: allowable clutch synchronizing time
"t": elapsed time from the start of engagement of the clutch 20.

At the step S82, when the control portion 40 judged that a defined clutch synchronizing time Tststd is equal to or less than the allowable clutch synchronizing time Tstmax (S82: YES), advances the program to the step S83. When the control portion 40 judged that the defined clutch synchronizing time Tststd is longer than the allowable clutch synchronizing time Tstmax (S82: NO), advances the program to the step S84. It is noted that the defined clutch synchronizing time Tststd is the synchronizing time of the clutch 20 predetermined in advance.

At the step S83, the control portion 40 sets the defined clutch synchronizing time Tststd to be the target clutch synchronizing time Tst and advances the program to the step S67.

At the step S84, the control portion 40 sets the allowable clutch synchronizing time Tstmax to the target clutch synchronizing time Tst and advances the program to the step S67.

The processing of the engine start control according to the second embodiment in the steps S67 through S74 is the same as that of the engine start control according to the first embodiment in the steps S67 through S74 and therefore the explanation thereof will be omitted.

It is noted that at the step S67, the control portion 40 calculates the target clutch transmitting torque Tct by substituting the current rotation speed of the input shaft 51 as the target input shaft rotation speed ω̃it_0 at the start of engagement into the above formula (3).

Figure 10A:
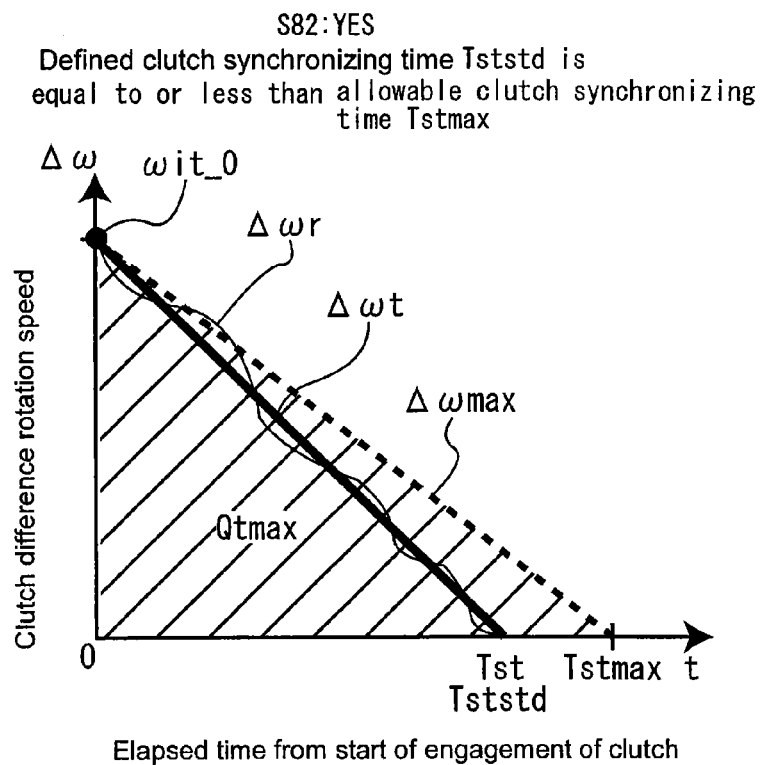
FIG. 10A is a graph, the horizontal axis thereof indicating the elapsed time "t" from the start of engagement of the clutch and the vertical axis thereof indicating the clutch difference rotation speed $\Delta\omega$, wherein the graph shows the relationship between the allowable clutch difference rotation speed $\Delta\omega max$ and the elapsed time "t" from the start of engagement of the clutch when the defined clutch synchronizing time is equal to or less than the allowable clutch synchronizing time.

It is noted that when the judgment at the step S82 is "YES", at the step S69, the control portion 40 renews the target input shaft rotation speed ω̃it during the clutch 20 being in engagement by substituting the defined clutch synchronizing time Tststd as the target clutch synchronizing time Tst into the formula (5) above. Thus, when the target input shaft rotation speed ω̃it is renewed, as shown in FIG. 10A with the bold line, the relationship between the target clutch difference rotation speed Δω̃t and the elapsed time "t" from the start of engagement of the clutch 20 is represented as a direct function in which the target clutch difference rotation speed Δω̃t gradually decreases as the elapsed time "t" increases and becomes zero after the defined clutch synchronizing time Tststd which corresponds to the target clutch synchronizing time Tst elapsed. The difference rotation speed Δω̃r of the clutch 20 drops along the line of target clutch difference rotation speed Δω̃t by controlling the rotation speed of the first motor/generator MG1 at the step S70. Accordingly, the difference rotation speed Δω̃ of the clutch 20 gradually drops with time from the start of engagement of the clutch 20 along the line of the target clutch difference rotation speed Δω̃t as shown in FIG. 10A with the fine line and eventually becomes zero after the target clutch synchronizing time Tst elapsed and the clutch 20 is synchronized.

Figure 10B:
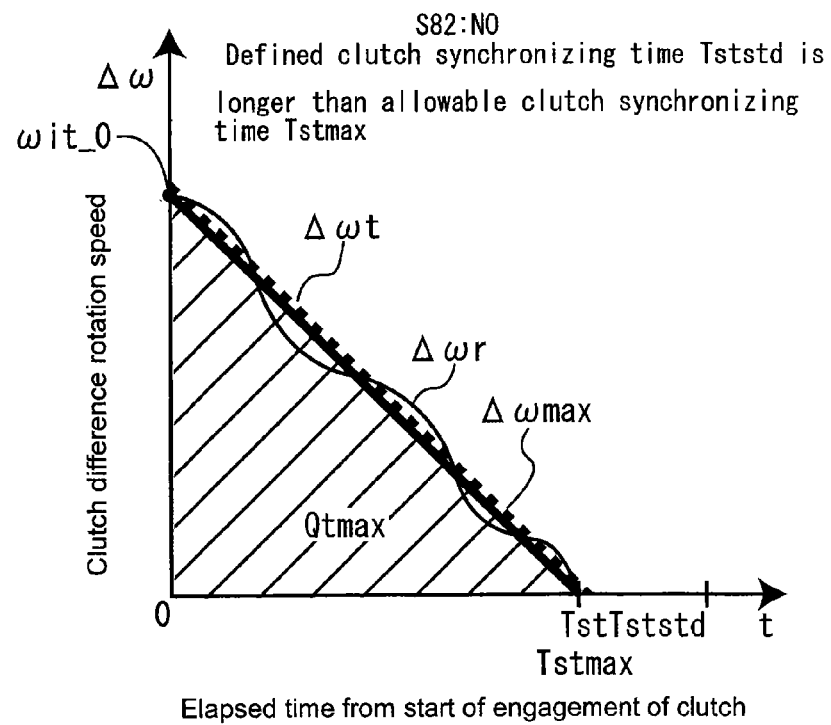
FIG. 10B is a graph, the horizontal axis thereof indicating the elapsed time "t" from the start of engagement of the clutch and the vertical axis thereof indicating the clutch difference rotation speed $\Delta\tilde{\omega}$, wherein the graph shows the relationship between the allowable clutch difference rotation speed $\Delta\tilde{\omega}$max and the elapsed time "t" from the start of engagement of the clutch when the defined clutch synchronizing time is larger than the allowable clutch synchronizing time.

Further, when the judgment at the step S82 is "NO", at the step S69, the control portion 40 renews the target input shaft rotation speed ω̃it during the clutch 20 being in engagement by substituting the allowable clutch synchronizing time Tstmax as the target clutch synchronizing time Tst into the formula (5) above. Thus, as shown in FIG. 10B with the bold line, the relationship between the target clutch difference rotation speed Δω̃t and the elapsed time "t" from the start of engagement of the clutch 20 is represented as a direct function in which the target clutch difference rotation speed Δω̃t gradually decreases as the elapsed time "t" increases and becomes zero after the allowable clutch synchronizing time Tstmax which corresponds to the target clutch synchronizing time Tst elapsed. It is noted here that the judgment at the step S82 is "NO", the target clutch difference rotation speed Δω̃t is the same with the allowable clutch difference rotation speed Δω̃max (Bold broken line). Accordingly, the difference rotation speed Δω̃ of the clutch 20 gradually drops with time from the start of engagement of the clutch 20 along the line of the target clutch difference rotation speed Δω̃t as shown in FIG. 10B with the fine line and eventually becomes zero after the target clutch synchronizing time Tst elapsed and the clutch 20 is synchronized.

As shown at the step S81 in FIG. 11, the control portion 40 (allowable clutch synchronizing time calculating means) calculates the allowable clutch synchronizing time Tstmax which corresponds to the clutch synchronizing time allowable for clutch engagement based on the allowable clutch heat generation amount Qtmax. Then, as shown in FIG. 10, the control portion 40 (motor/generator rotation control means) in the steps S68 through S72 in FIG. 11 controls the rotation speed of the first motor/generator MG1 so that the clutch difference rotation speed Δω̃r gradually decreases with time from the start of engagement of the clutch 10 and finally becomes zero within the allowable clutch synchronizing time Tstmax. Accordingly, since the clutch synchronizing time before the clutch 20 being engaged is set to be less than the allowable clutch synchronizing time Tstmax calculated not to exceed the allowable clutch heat generation amount Qtmax (shaded area shown in FIG. 10), the heat generation amount under the clutch 20 being in engagement can be surely prevented from exceeding the allowable clutch heat generation amount and overheating of the clutch 20 can be surely prevented.

It is noted that according to the hybrid drive device according to the second embodiment, after the process of the step S74 in FIG. 11 ends and after the clutch has been engaged, if the allowable clutch heat generation amount Qmax is smaller than a first defined heat generation amount, the control portion 40 keeps the engagement state of the clutch 20 and forbids the disconnection of the clutch 20 not to perform clutch engagement until the allowable clutch heat generation amount Qmax reaches to a second defined heat generation amount (which is equal to or more than the first defined heat generation amount value). Thus, the overheating of the clutch 20 can be prevented.

Third Embodiment

The third embodiment of the hybrid drive device will be explained hereinafter with reference to FIGS. 13 through 15, but only the different points from the first embodiment. According to the third embodiment, as shown in FIG. 13, the control portion 40 varies the curvature of the function (curved line) which represents the relationship between the target clutch difference rotation speed Δω̃t and the elapsed time from the start of engagement of the clutch 20 so that the heat generation amount during the clutch 20 being in engagement can be set to equal to or less than the allowable clutch heat generation amount Qtmax.

The engine start control according to the third embodiment will be explained with reference to the flowchart in FIG. 14. When the engine start control according to the third embodiment starts, at the step S91, the control portion 40 calculates the allowable curvature of the curved line (hereinafter referred to simply as "allowable curvature" from time to time) representing the relationship between the target clutch difference rotation speed $\Delta \tilde{\omega}t$ and the elapsed time from the start of engagement of the clutch 20. More specifically, the control portion 40 calculates the allowable clutch heat generation amount Qtmax, with the same way as in the steps S61-1 and S61-2 in FIG. 5 explained above. Then the control portion 40 calculates the engine EG friction torque Te with the same way as in the steps S61-3 in FIG. 5.

Figure 15:
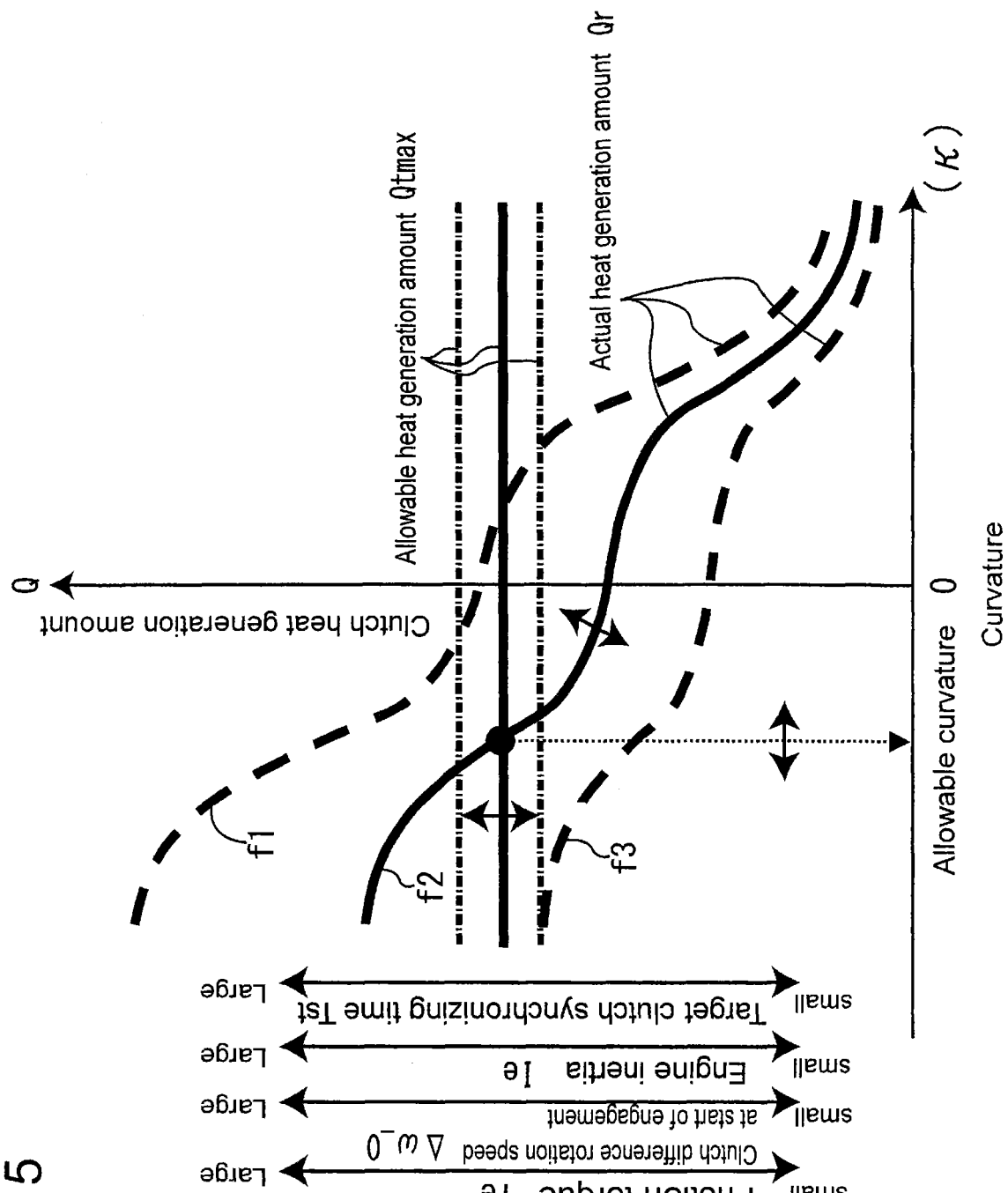
FIG. 15 is a graph, the vertical axis thereof indicating the clutch heat generation amount Q and the horizontal axis thereof indicating the curvature, wherein the graph shows the relationship between the allowable clutch heat generation amount Qtmax and the actual clutch heat generation amount Qr and the curvature.

Then, the control portion 40 calculates a function (curved line) as shown in FIG. 15, which represents the relationship between the curvature of the curved line representing the relationship between the clutch difference rotation speed $\Delta \tilde{\omega}$ and the elapsed time "t" from the start of engagement of the clutch 20 (hereinafter referred to as "curvature of clutch difference rotation speed $\Delta \tilde{\omega}$") and the actual clutch heat generation amount Qr by inputting the engine EG friction torque Te, clutch difference rotation speed $\Delta \tilde{\omega}\_0$ at the start of engagement, engine inertia Ie and the target clutch synchronizing time Tst into the mapping data or the calculating formula which illustrates the relationship thereof with the friction torque Te of the engine EG, clutch difference rotation speed $\Delta \tilde{\omega}\_0$ at the start of engagement, engine inertia Ie, actual clutch heat generation amount Qr, the clutch synchronizing time Tst and the relationship between the curvature of the curved line representing the relationship between the clutch difference rotation speed $\Delta \tilde{\omega}$ and the elapsed time "t" from the start of engagement of the clutch 20. It is noted that since the engine EG is stopped at the start of the clutch 20 engagement, the value of the clutch difference rotation speed $\Delta \tilde{\omega}\_0$ at the start of engagement is the value of the input shaft rotation speed $\tilde{\omega}i\_0$ at the start of engagement of the clutch 20. The control portion 40 inputs the current input shaft rotation speed $\tilde{\omega}i$ as the clutch difference rotation speed $\Delta \tilde{\omega}\_0$ at the start of engagement into the mapping data or the calculation formula.

It is noted that the mapping data or the calculation formula is set to calculate a function in which the actual heat generation amount Qr becomes large as the friction torque Te becomes large with respect to the relationship with the curvature of the clutch difference rotation speed $\Delta \tilde{\omega}$ (the function becomes more in the function f1 side than in the function f3 side). Further, the mapping data or the calculation formula is set to calculate a function in which the actual heat generation amount Qr becomes large as the clutch difference rotation speed $\Delta \tilde{\omega}\_0$ at the start of engagement becomes large with respect to the relationship with the curvature of the clutch difference rotation speed $\Delta \tilde{\omega}$ (the function becomes more in the function f1 side than in the function f3 side). Still further, the mapping data or the calculation formula is set to calculate a function in which the actual heat generation amount Qr becomes large as the engine inertia Ie becomes large with respect to the relationship with the curvature of the clutch difference rotation speed $\Delta \tilde{\omega}$ (the function becomes more in the function f1 side than in the function f3 side). The mapping data or the calculation formula is further set to calculate a function in which the actual heat generation amount Qr becomes large as the target clutch synchronizing time Tst becomes large with respect to the relationship with the curvature of the clutch difference rotation speed $\Delta \tilde{\omega}$ (the function becomes more in the function f1 side than in the function f3 side).

Next, the control portion 40 calculates the allowable curvature of the curved line (hereinafter referred to as simply "allowable curvature") which represents the relationship between the target clutch difference rotation speed $\Delta \tilde{\omega}t$ and the elapsed time from the start of engagement of the clutch 20 based on the allowable clutch heat generation amount Qtmax and the function representing the relationship between the target clutch difference rotation speed $\Delta \tilde{\omega}t$ curvature and the actual heat generation amount Qr. In more detail, as shown in FIG. 15, the curvature of the target clutch difference rotation speed $\Delta \tilde{\omega}t$ is calculated from the intersection point between the allowable clutch heat generation amount Qtmax which is represented as the direct function and the relationship between the curvature of the target clutch difference rotation speed $\Delta \tilde{\omega}t$ and the actual clutch heat generation amount Qr which is represented as a function. After the process of the step S91, the program goes to the step S92.

Figure 13A:
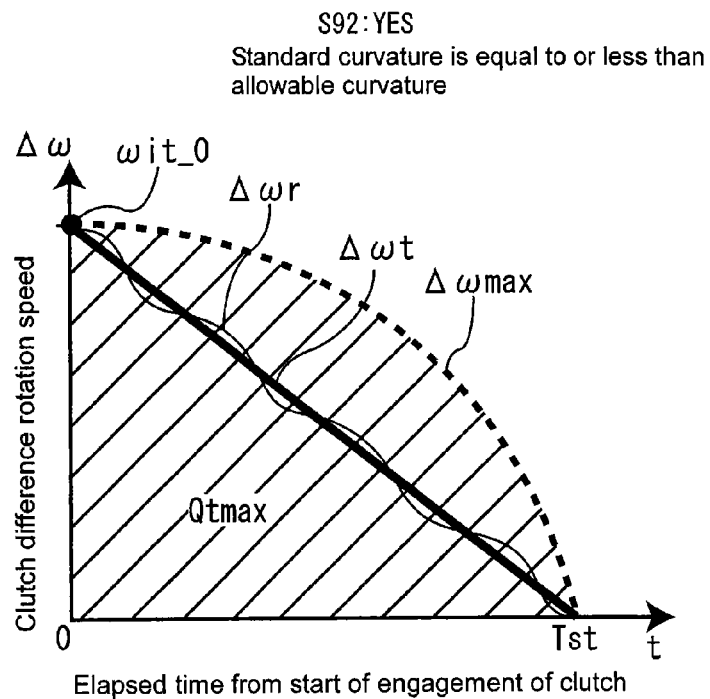
FIG. 13A is a graph, the horizontal axis thereof indicating the elapsed time "t" from the start of engagement of the clutch and the vertical axis thereof indicating the clutch difference rotation speed $\Delta\tilde{\omega}$, wherein the graph shows the relationship between the allowable clutch difference rotation speed $\Delta\tilde{\omega}$max and the elapsed time "t" from the start of engagement of the clutch when the "standard curvature" is equal to or less than the "allowable curvature"

At the step S92, when the control portion 40 judged that the allowable curvature calculated at the step S91 is equal to or less than a standard curvature of the curved line (hereinafter referred to simply as "standard curvature") which represents the relationship between the target clutch difference rotation speed $\Delta \tilde{\omega}t$ and the elapsed time from the start of engagement of the clutch 20 (S92: YES), the control portion 40 advances the program to the step S93 and when the control portion 40 judged that allowable curvature calculated at the step S91 is larger than the standard curvature (S92: NO), the control portion 40 advances the program to the step S94. It is noted here that the standard curvature is set in advance and for example, as shown in FIG. 13A, the curvature may be set to be zero and the relationship between the target clutch difference rotation speed $\Delta \tilde{\omega}t$ and the elapsed time from the start of engagement of the clutch 20 is represented as a direct function.

At the step S93, the control portion 40 sets the "standard curvature" to be the "target curvature" of the target clutch difference rotation speed $\Delta \tilde{\omega}t$ (hereinafter referred to as simply "target curvature") and advances the program to the step S95.

At the step S94, the control portion 40 sets the "allowable curvature" to be the "target curvature" and advances the program to the step S95.

At the step S94, the control portion 40 calculates the target clutch transmitting torque Tct based on the target curvature. More specifically, the control portion 40 calculates the target clutch transmitting torque Tct by inputting the target curvature, engine EG friction torque Te, clutch difference rotation speed $\Delta \tilde{\omega}\_0$ at the start of engagement, engine inertia Ie and target clutch synchronizing time Tst into the mapping data or the calculation formula which illustrates the relationship thereof with the target curvature, engine EG friction torque Te, clutch difference rotation speed $\Delta \tilde{\omega}\_0$ at the start of engagement, engine inertia Ie and target clutch synchronizing time Tst and the target clutch transmitting torque Tct. After the process at the step S95, the program goes to the step S68.

The processing of the engine start control according to the third embodiment in the steps S68 through S71 is the same as that of the engine start control according to the first embodiment in the steps S68 through S71 and therefore the explanation thereof will be omitted.

At the step S97, when the control portion 40 judged that the engine rotation speed $\tilde{\omega}e$ agrees to the input shaft rotation speed $\tilde{\omega}i$ (S97: YES), the program goes to the step S73 and when the control portion 40 judged that the engine rotation speed ωe does not agree to the input shaft rotation speed ωi (S97: NO), the program returns to the step S95.

The processing of the engine start control according to the third embodiment in the steps S73 and S74 is the same as that of the engine start control according to the first embodiment in the steps S73 and S74 and therefore the explanation thereof will be omitted.

It is noted that when the judgment at the step S92 is "YES", at the step S93, the control portion 40 sets the standard curvature to the target curvature. Then, as shown in FIG. 13A with bold line, the curvature representing the relationship between the target clutch difference rotation speed Δωt and the elapsed time "t" from the start of engagement of the clutch 20 becomes the standard curvature which is a function, in which the target clutch difference rotation speed Δωt gradually decreases as the elapsed time "t" increases and becomes zero after the target clutch synchronizing time Tst elapsed. The difference rotation speed ωr of the clutch 20 drops along the line of the clutch difference rotation speed Δω by controlling the rotation speed of the first motor/generator MG1 at the step S70. Accordingly, the difference rotation speed Δωr of the clutch 20 gradually drops with time from the start of engagement of the clutch 20 along the line of the target clutch difference rotation speed Δωt as shown in FIG. 13A with the fine line and eventually becomes zero after the target clutch synchronizing time Tst elapsed and the clutch 20 is synchronized.

Figure 13B:
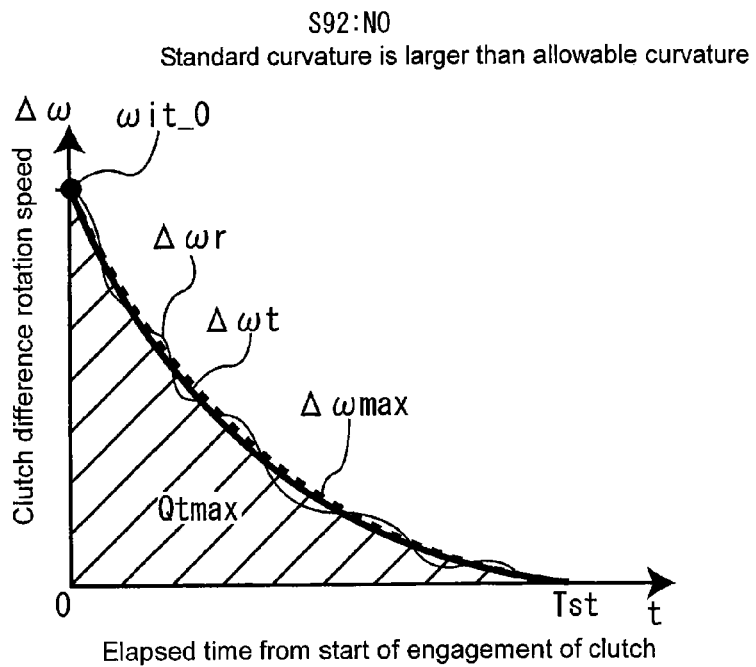
FIG. 13B is a graph, the horizontal axis thereof indicating the elapsed time "t" from the start of engagement of the clutch and the vertical axis thereof indicating the clutch difference rotation speed $\Delta\tilde{\omega}$, wherein the graph shows the relationship between the allowable clutch difference rotation speed $\Delta\tilde{\omega}$max and the elapsed time "t" from the start of engagement of the clutch when the "standard curvature" is larger than the "allowable curvature"

Further, when the judgment at the step S92 is "NO", at the step S94, the control portion 40 sets the standard curvature to the target curvature. Then, as shown in FIG. 13B with the bold line, the curvature of the curved line representing the relationship between the target clutch difference rotation speed Δωt and the elapsed time "t" from the start of engagement of the clutch 20 is represented as a function in which the target clutch difference rotation speed Δωt gradually decreases as the elapsed time "t" increases and becomes zero after the target clutch synchronizing time Tst elapsed. It is noted here as shown in FIG. 13B, the target clutch difference rotation speed Δωt is the same value with the allowable clutch difference rotation speed Δωmax (See bold broken line in FIG. 13B). Therefore, as shown in FIG. 13B with the fine line, the clutch difference rotation speed Δωr gradually drops with time from the start of engagement of the clutch 20 along the line of the target clutch difference rotation speed Δωt and eventually becomes zero after the target clutch synchronizing time Tst elapsed and the clutch 20 is synchronized.

As explained, the hybrid drive device according to the third embodiment also suppresses the heat generation amount of the clutch 20 to the allowable clutch heat generation amount Qtmax (shaded area in FIG. 13) or less and the overheating of the clutch 20 can be surely prevented.

It is noted that according to the hybrid drive device according to the third embodiment, after the process of the step S74 in FIG. 14 ends and after the clutch has been engaged, if the allowable clutch heat generation amount Qmax is smaller than a first defined heat generation amount, the control portion 40 keeps the engagement state of the clutch 20 and forbids the disconnection of the clutch 20 not to perform clutch engagement until the allowable clutch heat generation amount Qmax reaches to a second defined heat generation amount (which is equal to or more than the first defined heat generation amount value). Thus, the overheating of the clutch 20 can be prevented.

In this embodiment, the control portion 40 varies the curvature of the function (curved line) which represents the relationship between the target clutch difference rotation speed Δωt and the elapsed time from, the start of engagement of the clutch 20. However, the control portion 40 is structured to vary a degree in the "n"-th dimension function representing the relationship between the target clutch difference rotation speed Δωt and the elapsed time from the start of engagement of the clutch 20. This may also minimize the heat generation amount during the clutch 20 being in engagement to the allowable clutch heat generation amount Qtmax or less.

Fourth Embodiment

Figure 16:
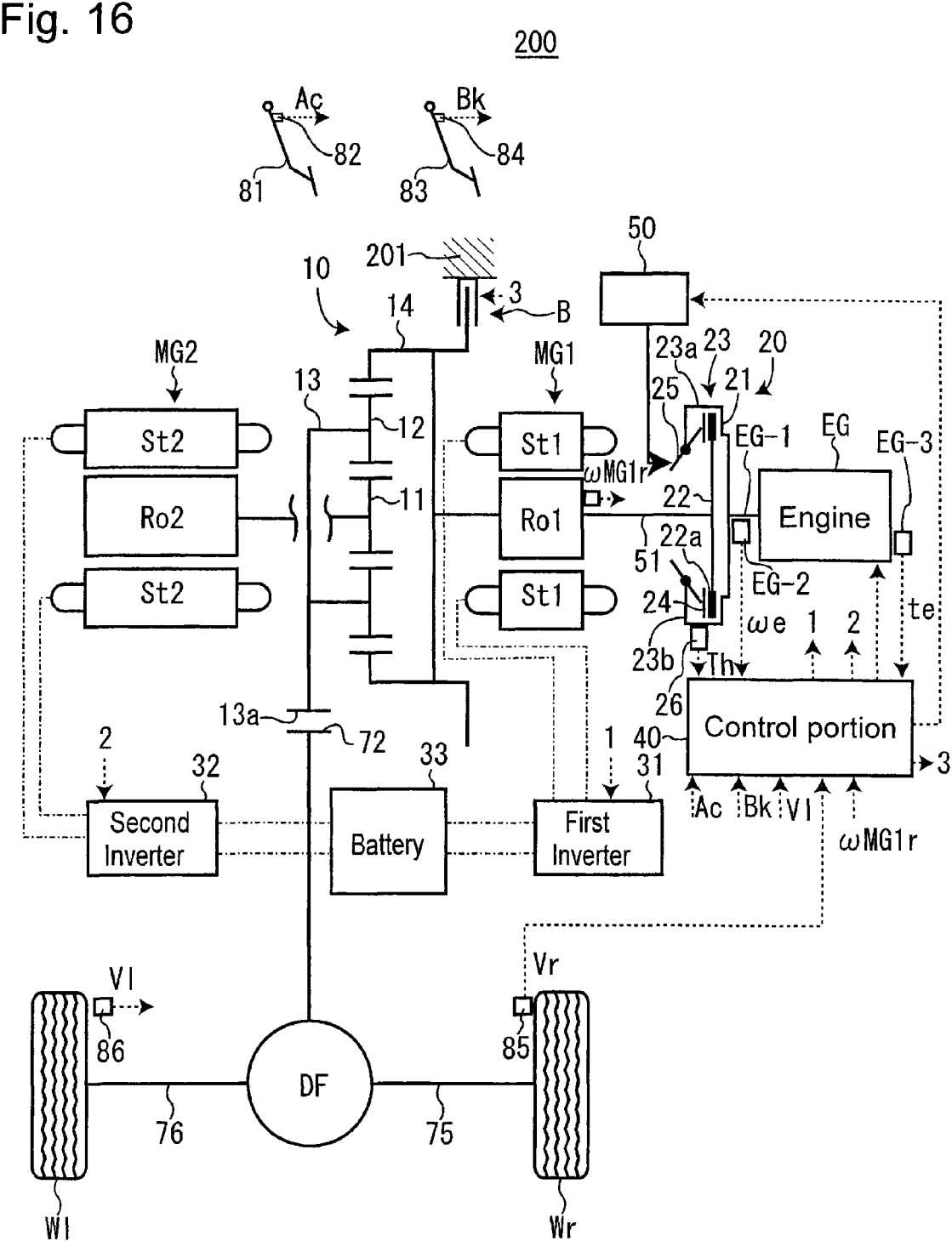
FIG. 16 is a skeleton view indicating the structure of the hybrid drive device according to a fourth embodiment of the invention; and, FIG. 17 is a block diagram of PID (Proportional-Integral-Derivative) control embodiment which controls the clutch difference rotation speed $\Delta\tilde{\omega}$r.

The fourth embodiment of the hybrid drive device 200 will be explained with reference to FIG. 16, explaining the different points from those of the hybrid drive device 100 in the first embodiment. The same structure of the hybrid drive device of this embodiment with the structure of the hybrid drive device 100 of the first embodiment will be referred to by the same reference numerals or symbols and the explanation thereof will be omitted.

The hybrid drive device 200 according to the fourth embodiment includes the first rotor Ro1 of the first motor/generator MG1 connected to the input shaft 51 and at the same time connected to the ring gear 14 of the planetary gear mechanism 10. The sun gear 11 of the planetary gear mechanism 10 is connected to the second rotor Ro2 of the second motor/generator MG2. The carrier 13 is formed with an output gear 13a which is engaged with the input gear 72.

The ring gear 14 is rotatably connected to or securely fixed to a housing 201 by means of a brake B. The brake B is controlled by the control portion 40.

Under the electric running mode, the control portion 40 controls the actuator 50 to disconnect the clutch 20 and at the same time controls the brake B to fix the ring gear 14 to the housing 201. Further, the control portion 40 outputs a control signal to the second inverter 32 to rotationally drive the second motor/generator MG2 so that the rotation drive force thereof agrees with the required drive force. Further, when a sufficient required drive force cannot be obtained only by the rotation drive force from the second motor/generator MG2, the control portion 40 controls the actuator 50 to disconnect the clutch 20 and at the same time controls the brake B so that the ring gear 14 is rotatably connected to the housing 201. Then the control portion 40 outputs control signals to both first and second inverters 31 and 32 to drive both first and second motor/generators MG1 and MG2 to output the drive force to agree to the required drive force.

Under the split running mode, the control portion 40 controls the actuator 50 to engage the clutch 20 and at the same time controls the brake B to rotatably support the ring gear 14 on the housing 201. Further, the control portion 40 outputs a control signal to the second inverter 32 to drive the second motor/generator MG2 and at the same time controls the engine EG to generate a predetermined rotation drive force. Thus, the engine EG and the input shaft 51 are connected and the engine rotation drive force is transmitted to the first motor/generator MG1 and accordingly to the ring gear 14. The first motor/generator MG1 generates the electricity by the engine rotation drive force. The engine rotation drive force inputted to the ring gear 14 and the motor/generator MG2 rotation drive force are transmitted to the drive wheels Wr and Wl.

According to this fourth embodiment, the following formula (7) is applied instead of the formula (2) above.

$$\omega MG1t = \omega it \quad (7)$$

ωMG1t: target rotation speed of the first motor/generator MG1
ωit: target input shaft rotation speed.

The control portion 40 executes the clutch/engine control (See FIG. 3) and the engine start control (See FIG. 4). It is noted however that in the step S70 in FIG. 4, the control portion 40 rotatably controls the rotation of the first motor/generator MG1 by outputting the control signal to the first inverter 31 so that the input shaft rotation speed ωi becomes equal to the target input shaft rotation speed ωit_0 at the start of engagement (equal to or less than the allowable clutch difference rotation speed Δω_0max at the start of engagement). Further, in the step S70 in FIG. 4, the control portion 40, by outputting the control signal to the first inverter 31, rotatably controls the rotation of the first motor/generator MG1 so that the input shaft rotation speed ωi becomes equal to the target input shaft rotation speed ωit being in engagement.

It may be possible to implement an embodiment which combines the structure of the hybrid drive device 200 according to the fourth embodiment with the engine start control of the second embodiment or the third embodiment.

Fifth Embodiment

The hybrid drive device according to the fifth embodiment will be explained, explaining the different points from those of the hybrid drive device 100 in the first embodiment. According to the first embodiment, the control portion 40 controls the input shaft rotation speed ωi by controlling the rotation speed of the first motor/generator MG1 when the clutch is engaged. However, according to the fifth embodiment, the control portion 40 controls the clutch difference rotation speed Δωr by controlling the rotation speed of the first motor/generator MG1 when the clutch is engaged.

At the step S63, the control portion 40 sets the current clutch difference rotation speed Δω r to the target clutch difference rotation speed Δωt_0 at the start of engagement.

At the step S69, the control portion 40 calculates the target clutch difference rotation speed Δωt by substituting the target clutch difference rotation speed Δωt_0 at the start of engagement, target clutch synchronizing time Tst and the elapsed time "t" from the start of engagement of the clutch 20 into the following formula (13).

$$\Delta\omega t = -(\Delta\omega t\_0 Tst) \times t + \Delta\omega t\_0 \quad (13)$$

Δωt: target clutch difference rotation speed:
ωt_0: target clutch difference rotation speed at the start of engagement
Tst: target clutch synchronizing time:
t: elapsed time from the start of engagement of the clutch 20:

At the step S64, the control portion 40 sets the allowable clutch difference rotation speed Δωt_0max at the start of engagement of the clutch 20 to the target clutch difference rotation speed Δωt_0 at the start of engagement.

Figure 17:
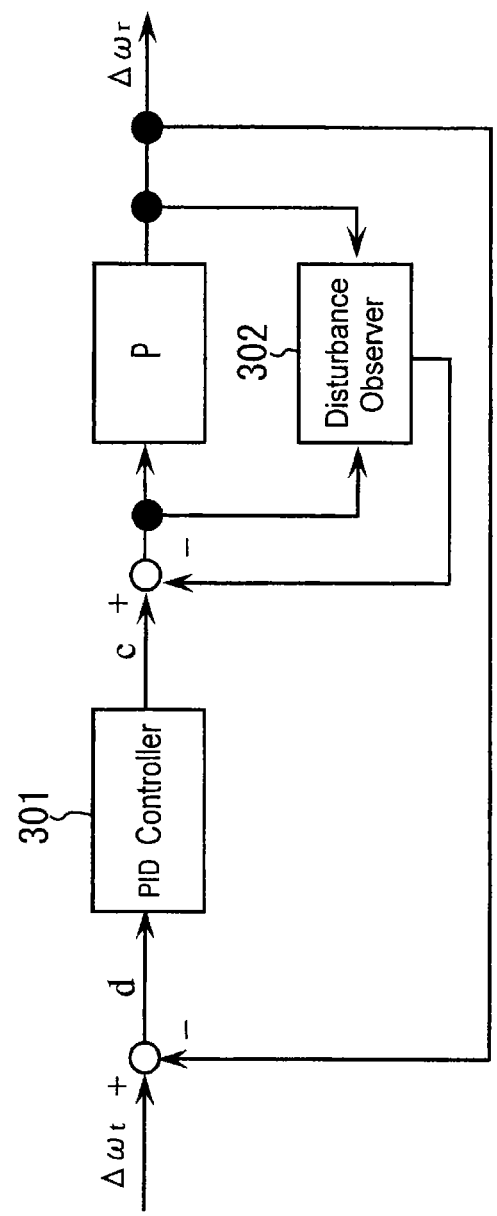

At the step S65, the control portion 40 controls the clutch difference rotation speed Δωr by controlling the rotation speed of the first motor/generator MG1 so that the clutch difference rotation speed Δωr becomes the target clutch difference rotation speed Δωt_0 at the start of engagement calculated at the step S64. This control is executed by PID (feedback control) which is illustrated in FIG. 17 by the PID control block diagram. According to the embodiment, as shown in FIG. 17, the PID controller 301 and the disturbance observer 302 are incorporated into the control portion 40. However, these are structured separately from the control portion 40. The plant P which is the object of the control indicates the first inverter 31 and the first motor/generator MG1 and the target amount is the target clutch difference rotation speed Δωt and the control amount is the clutch difference rotation speed Δωr.

The control portion 40 compares the target clutch difference rotation speed Δωt and the clutch difference rotation speed Δωr and calculates the difference therebetween, the control deviation "d". Based on the control deviation "d", a proper amount of the operation amount "c" for adjusting the clutch difference rotation speed which corresponds to the control amount is calculated and the calculated operation amount "c" is outputted to the first inverter 31. The disturbance observer 302 calculates the disturbance amount which is the variations of the change of the engine rotation speed ωe and change of the vehicle speed V based on the variation of the clutch difference rotation speed Δωr which corresponds to the control amount and executes a feedback control in which the operation amount "c" is increased or decreased in the direction negating the influence of the disturbance on the control amount. The first inverter 31 in which the operation amount c is inputted, then outputs AC current to the first motor/generator MG1 in response to the new operation amount "c". The first motor/generator MG1 changes the clutch difference rotation speed Δωr which corresponds to the control amount.

According to the fifth embodiment, at the step S69 in FIG. 4, the control portion 40 (target clutch difference rotation speed calculating means) calculates the target clutch difference rotation speed Δunt by the formula (13) above based on the allowable target clutch difference rotation speed Δω_0max at the start of engagement and the target clutch synchronizing time Tst. At the step S70 in FIG. 4, the control portion 40 (motor/generator rotation control means) controls the rotation speed of the first motor/generator MG1 so that the clutch difference rotation speed Δωr during the clutch 20 being in engagement becomes the target clutch difference rotation speed Δωt. Thus, the target clutch difference rotation speed Δωt which satisfies the allowable clutch difference rotation from the time the clutch 20 starts engagement until the clutch 20 synchronizes after the target clutch synchronizing time elapsed. Therefore, the clutch 20 can be surely synchronized within the target clutch synchronizing time Tst. The heat generation amount of the clutch 20 in engagement can be suppressed to the allowable clutch heat generation amount Qtmax or less to surely prevent the overheating of the clutch 20.

Further, the control portion 40 (target clutch difference rotation speed calculating means) calculates the target clutch difference rotation speed Δωt so that the target clutch difference rotation speed Δωt gradually decreases with time from the start of engagement of the clutch 20 and becomes zero after the target clutch synchronizing time elapsed by using the formula (13) above (See FIG. 7). Then the control portion 40 (motor/generator rotation control means) controls the rotation speed of the first motor/generator MG1 so that the clutch difference rotation speed Δωr under the clutch 20 being in engagement becomes the target clutch difference rotation speed Δωt. Accordingly, since the clutch difference rotation speed Δωt is controlled to be gradually decreased with time from the start of engagement of the clutch 20, the heat generation amount of the clutch 20 at the engagement can be suppressed to the allowable clutch heat generation amount Qtmax and at the same time generation of vehicle shock can be prevented.

Sixth Embodiment

The hybrid drive device according to the sixth embodiment will be explained explaining the different points from the second embodiment. According to the second embodiment, the control portion 40 by controlling the rotation speed of the first motor/generator MG1 when the clutch is engaged, controls the input shaft rotation speed ωi. However, according to the sixth embodiment, the control portion 40 by controlling the rotation speed of the first motor/generator MG1 when the clutch is engaged controls the clutch difference rotation speed Δωr.

At the step S82, when the judgment is YES, in the processing at the step S69, the control portion 40 substitutes the defined clutch synchronizing time Tststd as the target clutch synchronizing time Tst into the formula (15) bellow and at the same time substitutes the clutch difference rotation speed Δω_0 at the start of engagement and the elapsed time "t" from the start of engagement of the clutch 20 into the formula (15) bellow to calculate and renew the target clutch difference rotation speed Δωt.

$$\Delta\omega t = -(\Delta\omega it\_0/Tst) \times t + \omega e + \Delta\omega\_0 \qquad (15)$$

Δωt: target clutch difference rotation speed:
Δω_0: target clutch difference rotation speed at the start of engagement
Tst: target clutch synchronizing time:

At the step S70, the control portion 40 controls the clutch difference rotation speed Δωr by controlling the rotation speed of the motor/generator MG1 so that the clutch difference rotation speed Δωr becomes the target clutch difference rotation speed Δωt calculated at the step S69. The control execution structure is the same with that explained with FIG. 17.

As explained, at the step S69, the target clutch difference rotation speed Δωt is renewed, as shown in FIG. 10A with the bold line, the relationship between the target clutch difference rotation speed Δωt and the elapsed time "t" from the start of engagement of the clutch 20 is represented as a direct function in which the target clutch difference rotation speed Δωt gradually decreases as the elapsed time "t" increases and becomes zero after the defined clutch synchronizing time Tststd which corresponds to the target clutch synchronizing time Tst elapsed. At the step S70, by controlling the rotation speed of the first motor/generator MG1, the difference rotation speed Δωr of the clutch 20 drops along the line of the target clutch difference rotation speed Δωt. Therefore, the difference rotation speed Δω of the clutch 20 gradually decreases with time from the start of engagement of the clutch 20 along the line of target clutch difference rotation speed Δωt as shown in FIG. 10A with the fine line, and after the target clutch synchronizing time Tst elapsed, becomes zero and the clutch 20 is synchronized.

When the judgment at the step S82 is "NO", at the step S69, the control portion 40 sets the allowable clutch synchronizing time Tstmax to be the target clutch synchronizing time Tst and substitutes the value into the formula (15) above. At the same time the control portion 40 substitutes the clutch difference rotation speed Δω_0 at the start of engagement and the elapsed time "t" from the start of engagement of the clutch 20 into the formula (15) above to calculate and renew the target clutch difference rotation speed Δωt.

At the step S70, the control portion 40 controls the clutch difference rotation speed Δωr by controlling the rotation speed of the motor/generator MG1 so that the clutch difference rotation speed Δωr becomes the target clutch difference rotation speed Δωt calculated at the step S69. The control execution structure is the same with that explained with FIG. 17.

Thus, when the target clutch difference rotation speed Δωt is renewed, as shown in FIG. 10B with the bold line, the relationship between the target clutch difference rotation speed Δωt and the elapsed time "t" from the start of engagement of the clutch 20 is represented as a direct function in which the target clutch difference rotation speed Δωt gradually decreases as the elapsed time "t" increases and becomes zero after the allowable clutch synchronizing time Tstmax which corresponds to the target clutch synchronizing time Tst elapsed. It is noted that when the judgment at the step S82 is "NO", the target clutch difference rotation speed Δωt is the same with the allowable clutch synchronizing time Tstmax (See bold broken line). Accordingly, the difference rotation speed Δω of the clutch 20 gradually drops with time from the start of engagement of the clutch 20 along the line of the target clutch difference rotation speed Δωt as shown in FIG. 10B with the fine line and eventually becomes zero after the target clutch synchronizing time Tst elapsed and the clutch 20 is synchronized.

Thus, according to the sixth embodiment, before the clutch is engaged, the clutch 20 synchronizing time is controlled to be equal to or less than the allowable clutch synchronizing time Tstmax which is calculated not to exceed the allowable clutch heat generation amount Qtmax. Accordingly, the heat generation amount of the clutch 20 can be surely prevented from exceeding the allowable clutch heat generation amount Qtmax (shaded area in FIG. 10) under the clutch 20 being in engagement.

Other Embodiments

According to the embodiments explained heretofore, at the step S65 in FIG. 4, the control portion 40 controls the rotation speed ωMG1r of the first motor/generator MG1 so that the input shaft rotation speed ωi agrees to the target input shaft rotation speed ωit_0 at the start of engagement (allowable clutch difference rotation speed Δω_0max at the start of engagement). However, the control portion 40 may control the rotation speed ωMG1r of the first motor/generator MG1 so that the input shaft rotation speed ωi becomes equal to or less than the target input shaft rotation speed ωit_0 at the start of engagement.

According to the embodiments explained heretofore, at the step S70 in FIGS. 4, 11 and 14, the control portion 40 controls the rotation speed ωMG1r of the first motor/generator MG1 so that the rotation speed ωMG1r agrees to the target input shaft rotation speed ωit during engagement. However, the control portion 40 may control the rotation speed ωMG1r of the first motor/generator MG1 so that the rotation speed ωMG1r becomes equal to or less than target input shaft rotation speed ωit during engagement.

According to the embodiments explained heretofore, at the step S69 in FIGS. 4, 11 and 14, the control portion 40 renews the target input shaft rotation speed ωit during the clutch being in engagement and controls the rotation speed ωMG1r of the first motor/generator MG1 by feedback control (PID) operation at the step S70 in FIGS. 4, 11 and 14 so that he rotation speed ωMG1r agrees to the target rotation speed ωMG1t calculated above. However, the control portion 40 may calculate the target clutch difference rotation speed Δωt and execute the feedback control (PID) in a manner explained above, so that the actual clutch difference rotation speed Δωr agrees to the target clutch difference rotation speed Δωt as calculated above.

Further, according to the embodiments explained heretofore, at the step S61-1 in FIG. 5, the control portion 40 obtains by estimation the clutch temperature Tcrt which corresponds to the temperature of the friction member 22a based on the housing inside temperature Th detected by the temperature sensor 26, the heat generation amount of the friction member 22a and the integrated value of the heat dissipation amount of the friction member 22a and the clutch 20 as a whole. However, the clutch temperature Tcrt may be obtained by providing a temperature sensor such as heat dissipation sensor which detects the temperature of the friction member 22a in the vicinity of the friction member 22a.

Further, according to the embodiments explained heretofore, the control portion 40 calculates the input shaft rotation speed $\tilde{\omega}i$ which corresponds to the rotation speed of the input shaft 51 based on the rotation speed $\omega MG1r$ of the first motor/generator MG1 inputted from the rotation speed sensor MG1-1, the rotation speed $\omega MG2r$ of the second motor/generator MG2 (calculated from the vehicle speed V) and the number of teeth between the sun gear 11 and the inner gear 14a. However, an input shaft rotation speed detecting sensor which detects the rotation speed of the input shaft 51 may be provided in the vicinity of the input shaft 51 to directly detect the input shaft rotation speed $\tilde{\omega}i$.

According to the embodiments explained above, at the step S61-3 in FIG. 5, the control portion 40 calculates the friction torque Te of the engine EG based on the engine EG oil temperature by estimating the oil temperature based on the water temperature to detected by the water temperature sensor EG-3. However, the control portion 40 may calculate the engine friction torque Te based on the engine oil temperature detected by the oil temperature sensor (not shown) which detects the oil temperature of the engine EG.

At the step S61-4, the control portion 40 calculates the relationship between the clutch difference rotation speed $\Delta\tilde{\omega}\_0$ at the start of engagement and the actual clutch heat generation amount Qr which relationship is a quadratic function based on the friction torque Te of the engine EG, engine inertia Ie and the target clutch synchronizing time Tst. However, the engine inertia Ie and the target clutch synchronizing time Tst are predetermined in advance and the friction torque Te depends on the engine EG oil temperature. Therefore, the control portion 40 may calculate the relationship between the clutch difference rotation speed $\Delta\tilde{\omega}\_0$ at the start of engagement and the actual clutch heat generation amount Qr of the clutch 20 by inputting the engine EG oil temperature into the mapping data or the calculation formula which represents the relationship among the engine EG oil temperature, actual clutch heat generation amount Qr and the clutch difference rotation speed $\Delta\tilde{\omega}\_0$ at the start of engagement.

According to the embodiments explained above, at the step S69 in FIG. 4, the control portion 40 renews the target input shaft rotation speed $\tilde{\omega}it$ during engagement by substituting the target input shaft rotation speed $\tilde{\omega}it\_0$ at the start of engagement calculated at the step S63 or S64, the target clutch synchronizing time Tst, the elapsed time "t" elapsed from the start of engagement of the clutch 20 and the current engine rotation speed $\tilde{\omega}e$ into the formula (5) above. However, instead of substituting the current engine rotation speed $\tilde{\omega}e$, the control portion may substitute the engine EG rotation speed which is estimated during the clutch 20 engagement into the formula (5) thereby to renew the target input shaft rotation speed $\tilde{\omega}it$ during engagement. Or, the control portion 40 may renew the target input shaft rotation speed $\tilde{\omega}it$ during clutch 20 engagement by referencing the target input shaft rotation speed $\tilde{\omega}it\_0$ at the start of engagement set at the step S63 or S64, the target clutch synchronizing time Tst, the elapsed time "t" from the start of engagement of the clutch 20 and the current engine rotation speed $\tilde{\omega}e$ to the mapping data which represents the relationship with the target input shaft rotation speed, target clutch synchronizing time, elapsed time from the start of engagement of the clutch 20, the current engine rotation speed and the target input shaft rotation speed under the clutch 20 being in engagement.

According to the embodiments explained above, as shown in FIG. 7, the relationship between the target clutch difference rotation speed $\Delta\tilde{\omega}t$ and the elapsed time "t" from the start of engagement of the clutch 20 is represented as a direct function in which the target clutch difference rotation speed $\Delta\tilde{\omega}t$ gradually decreases as the elapsed time "t" increases. However, the relationship between the target clutch difference rotation speed $\Delta\tilde{\omega}t$ and the elapsed time "t" from the start of engagement of the clutch 20 may be represented as a quadratic function, or a cubic function in which the target clutch difference rotation speed $\Delta\tilde{\omega}t$ gradually decreases as the elapsed time "t" increases. Still further, the relationship between the target clutch difference rotation speed $\Delta\tilde{\omega}t$ and the elapsed time "t" from the start of engagement of the clutch 20 may be represented as an example such that in the vicinity of the above direct function, the target clutch difference rotation speed $\Delta\tilde{\omega}t$ gradually decreases as the elapsed time "t" increases.

According to the embodiments explained above, by gradually engaging the clutch 20, the rotation of the input shaft 51 is transmitted to the output shaft EG-1 to start rotation of the engine EG which has been stopped. However, the clutch 20 is gradually engaged with the clutch 20 being in disconnected state and the engine EG in having been started state to connect the output shaft EG-1 with the input shaft 51. It is apparent that such embodiment is applicable to the technology according to the invention.

Further, according to the embodiments as explained above, a dry, single plate type clutch is used for the clutch 20. However, the clutch 20 may be a wet, multiple plate type clutch. It is apparent that such embodiment is applicable to the technology according to the invention.

Further, as another embodiment, the vehicle with a rotation drive force from the first motor/generator MG1 only under the electric running mode engages the clutch 20 when the vehicle is running with the rotation drive force from both first and the second motor/generators MG1 and MG2. Such embodiment is also applicable to the technology of the invention.

According to a first aspect of an embodiment of the invention, the hybrid drive device 100, 200 includes an engine EG which outputs a rotation drive force to an output shaft EG-1, an input shaft 51 which is rotated in association with a rotation of a drive wheel Wi, Wr, a clutch 20 disposed between the output shaft and the input shaft for connecting or disconnecting the output shaft and the input shaft, a motor/generator MG1, MG2 which is rotated in association with a rotation of the input shaft, an allowable clutch heat generation amount calculating means 40 for calculating an allowable clutch heat generation amount Qtmax which corresponds to a heat generation amount that the clutch can allow under the clutch being in engagement and a motor/generator rotation control means 40 for controlling a rotation speed of the motor/generator not to exceed the allowable clutch heat generation amount calculated by the allowable clutch heat generation amount calculating means.

According to the first aspect of the embodiment of the invention, the allowable clutch heat generation amount calculating means 40 calculates the allowable clutch heat generation amount which corresponds to the heat generation amount that the clutch can allow and the motor/generator rotation control means controls the rotation speed of the motor/generator not to exceed the allowable clutch heat generation amount. Accordingly, the clutch heat generation amount can be limited to the allowable heat generation amount Qtmax or less. This can avoid an overheating of the clutch.

According to a second aspect of an embodiment of the invention, in addition to the feature of the first aspect, the hybrid drive device 100, 200 further includes an allowable clutch difference rotation speed calculating means 40 for calculating an allowable clutch difference rotation speed $\Delta\tilde{\omega}$max which corresponds to a difference rotation speed between the output shaft and the input shaft based on the allowable clutch heat generation amount Qtmax, wherein the motor/generator rotation control means 40 controls the rotation speed of the motor/generator so that a clutch difference rotation speed $\Delta\tilde{\omega}$ which corresponds to the difference rotation speed between the output shaft and the input shaft becomes equal to or less than the allowable clutch difference rotation speed. It is preferable for the motor/generator rotation control means to control the rotation speed of the motor/generator so that the clutch difference rotation speed under the clutch being in engagement is gradually decreased with time from a start of engagement of the clutch.

According to the second aspect of the embodiment of the invention, the allowable clutch difference rotation speed calculating means 40 calculates the allowable clutch difference rotation speed which corresponds to the difference in rotation speed between the output shaft and the input shaft based on the allowable clutch heat generation amount Qtmax and the motor/generator rotation control means controls rotation speed of the motor/generator so that the clutch difference rotation speed which is the difference in rotation speed between the output shaft and the input shaft becomes equal to or less than the allowable clutch difference rotation speed. Accordingly, a change of the clutch difference rotation speed due to a vehicle speed V change or an increase ratio of the engine rotation speed $\tilde{\omega}$e can be minimized. Since the clutch difference rotation speed is controlled not to exceed the allowable heat generation amount, the heat generation of the clutch can be assuredly limited to equal to or less than the allowable heat generation amount.

According to a third aspect of an embodiment of the invention, in addition to the feature of the first or the second aspect, the hybrid drive device 100, 200 further includes a clutch temperature obtaining means 40 for obtaining a current clutch temperature wherein the allowable clutch heat generation amount calculating means calculates the allowable clutch heat generation amount based on the current clutch temperature and a clutch allowable temperature which corresponds to a temperature that is an allowable temperature for the clutch.

According to the third aspect of the embodiment of the invention, the allowable clutch heat generation amount calculating means 40 calculates the allowable clutch heat generation amount based on the current clutch temperature and a clutch allowable temperature which corresponds to a temperature that can be allowed for the clutch. Since the clutch temperature is dropped to the allowable temperature or less when the clutch is engaged, even the current temperature of the clutch indicates any temperature the clutch overheating can be surely prevented.

According to a fourth aspect of the embodiment of the invention, in addition to the feature of the second aspect or the third aspect above, the allowable clutch difference rotation speed calculating means 40 calculates the allowable clutch difference rotation speed at a start of engagement which corresponds to the difference rotation speed between the output shaft and the input shaft at the start of engagement of the clutch and the motor/generator rotation control means 40 controls the rotation speed of the motor/generator so that the clutch difference rotation speed at the start of engagement which corresponds to the difference rotation speed between the output shaft and the input shaft at the start of engagement of the clutch becomes equal to or less than the allowable clutch difference rotation speed at the start of engagement.

According to the fourth aspect of the embodiment of the invention, the allowable clutch difference rotation speed calculating means 40 calculates the allowable clutch difference rotation speed at the start of engagement and the motor/generator rotation control means 40 controls the rotation speed of the motor/generator so that the clutch difference rotation speed at the start of engagement becomes equal to or less than the allowable clutch difference rotation speed at the start of engagement. Accordingly, the clutch difference rotation speed is set to be equal to or less than the allowable clutch difference rotation speed at the start of engagement which is calculated not to exceed the allowable clutch heat generation amount before the clutch engagement, the clutch heat generation amount under the clutch being in engagement would not exceed the allowable clutch heat generation amount and a heat generation amount excessively over the allowable clutch heat generation amount can be surely prevented.

According to a fifth aspect of the embodiment of the invention, in addition to the feature of the second aspect or the third aspect above, the allowable clutch difference rotation speed calculating means 40 calculates the allowable clutch difference rotation speed at the start of engagement which corresponds to the difference rotation speed between the output shaft and the input shaft at the start of engagement of the clutch and engages the clutch under a current clutch difference rotation speed, when the clutch difference rotation speed before the start of engagement of the clutch is equal to or less than the allowable clutch difference rotation speed at the start of engagement.

According to the fifth aspect of the embodiment of the invention, the allowable clutch difference rotation speed calculating means 40 calculates the allowable clutch difference rotation speed at the start of engagement which corresponds to the difference rotation speed between the output shaft and the input shaft at the start of engagement of the clutch and engages the clutch under a current clutch difference rotation speed, when the clutch difference rotation speed before the start of engagement of the clutch is equal to or less than the allowable clutch difference rotation speed at the start of engagement. Therefore, it is confirmed that the heat generation amount under the clutch being in engagement would not exceed the allowable clutch heat generation amount and after the confirmation, the clutch is engaged under the current clutch difference rotation speed without controlling of the clutch difference rotation speed by the motor/generator at the start of engagement of the clutch. Thus a prompt clutch engagement operation can be performed to save energy consumption by eliminating controlling of the clutch difference rotation speed by the motor/generator.

According to a sixth aspect of the embodiment of the invention, in addition to the feature of the fourth aspect or the fifth aspect, the allowable clutch difference rotation speed calculating means 40 calculates the allowable clutch difference rotation speed at the start of engagement based on the allowable clutch heat generation amount, a friction torque "Te" of the engine, an inertia "Ie" of the engine and a target clutch synchronizing time Tst which is a target elapsed time from the start of engagement of the clutch to a completion of synchronization of the output shaft and the input shaft.

According to the sixth aspect of the embodiment of the invention, the allowable clutch difference rotation speed calculating means 40 calculates the allowable clutch difference rotation speed at the start of engagement based on the allowable clutch heat generation amount, the friction torque Te of the engine, inertia Ie of the engine and a target clutch synchronizing time Tst. Accordingly, since the allowable clutch difference rotation speed at the start of engagement can be calculated considering the friction torque of the engine, the inertia of the engine and the target clutch synchronizing time, the clutch heat generation amount can be surely limited to the allowable clutch heat generation amount, regardless of the friction torque of the engine, the inertia of the engine and the target clutch synchronizing time. This can surely prevent an overheating of the clutch and accordingly, any clutch engagement interruption can be avoided, which may occur due to an overheating of the clutch and a prompt and sure clutch engagement operation can be performed.

According to a seventh aspect of the embodiment of the invention, in addition to the feature of any one of the fourth through sixth aspects, the hybrid drive device 100, 200 further includes a target input shaft rotation speed calculating means 40 which calculates a target input shaft rotation speed $\tilde{\omega}it$ which corresponds to a target rotation speed of the input shaft under the clutch being in engagement based on the allowable clutch difference rotation speed at the start of engagement and the target clutch synchronizing time which is the target elapsed time from the start of engagement of the clutch to the completion of synchronization of the output shaft and the input shaft, wherein the motor/generator rotation control means controls the rotation speed of the motor/generator so that the rotation speed of the input shaft under the clutch being in engagement becomes equal to or less than the target input shaft rotation speed. It is preferable that the target input shaft rotation speed calculating means 40 calculates the target clutch difference rotation speed also considering an engine rotation speed $\tilde{\omega}e$ which corresponds to the rotation speed $\tilde{\omega}i$ of the output shaft.

According to the seventh aspect of the embodiment of the invention, the target input shaft rotation speed calculating means 40 calculates the target input shaft rotation speed based on the allowable clutch difference rotation speed at the start of engagement and the target clutch synchronizing time. Further, the motor/generator rotation control means 40 controls the rotation speed of the motor/generator so that the rotation speed of the input shaft under the clutch being in engagement becomes equal to or less than the target input shaft rotation speed. Accordingly, the clutch synchronization can be surely performed within the target clutch synchronizing time by calculating the target input shaft rotation speed which can synchronize the clutch after the target clutch synchronizing time lapsed from the start of engagement of the clutch. Thus the heat generation of the clutch during engagement can be limited to the allowable clutch heat generation amount to prevent overheating of the clutch.

According to an eighth aspect of an embodiment of the invention in addition to the feature of the seventh aspect, the target input shaft rotation speed calculating means 40 calculates the target input shaft rotation speed so that the target input shaft rotation speed becomes zero upon an elapse of the target clutch synchronizing time Tst from the start of engagement of the clutch by gradually decreasing with time and the motor/generator rotation control means 40 controls the rotation speed of the motor/generator so that the rotation speed of the input shaft under the clutch being in engagement becomes the target input shaft rotation speed.

According to the eighth aspect of the invention, the target input shaft rotation speed calculating means 40 calculates the target input shaft rotation speed so that the target input shaft rotation speed becomes zero upon an elapse of the target clutch synchronizing time from the start of engagement of the clutch by gradually decreasing with time. The motor/generator rotation control means 40 controls the rotation speed of the motor/generator so that the rotation speed of the input shaft under the clutch being in engagement becomes the target input shaft rotation speed. Therefore, the clutch difference rotation speed is controlled to be decreased gradually with time from the start of engagement of the clutch, the heat generation amount at the time of clutch engagement can be suppressed to the allowable clutch heat generation amount and at the same time generation of the shocks of the vehicle can be prevented.

According to a ninth aspect of the invention, in addition to the feature of any one of the fourth through sixth aspects, the hybrid drive device 100, 200 further includes a target clutch difference rotation speed calculating means 40 which calculates a target clutch difference rotation speed which corresponds to a target clutch difference rotation speed under the clutch being in engagement based on the clutch allowable difference rotation speed at the start of engagement and the target clutch synchronizing time which corresponds to the target elapsed time from the start of engagement of the clutch to the completion of synchronization of the output shaft and the input shaft, wherein the motor/generator rotation control means controls the rotation speed of the motor/generator so that the clutch difference rotation speed under the clutch being in engagement becomes equal to or less than the target clutch difference rotation speed. It is noted that it is preferable that the target clutch difference rotation speed calculating means calculates the target clutch difference rotation speed also considering the engine rotation speed which corresponds to the rotation speed of the output shaft.

According to the ninth aspect of the invention, the target clutch difference rotation speed calculating means 40 calculates a target clutch difference rotation speed based on the clutch allowable difference rotation speed at the start of engagement and the target clutch synchronizing time and the motor/generator rotation control means controls the rotation speed of the motor/generator so that the clutch difference rotation speed under the clutch being in engagement becomes equal to or less than the target clutch difference rotation speed. Accordingly, the clutch synchronization can be surely performed within the target clutch synchronizing time by calculating the target clutch difference rotation speed which satisfies the allowable clutch difference rotation until the clutch is synchronized after the target clutch synchronizing time lapsed from the start of engagement of the clutch. Thus the heat generation of the clutch during engagement can be limited to the allowable clutch heat generation amount to prevent overheating of the clutch.

According to a tenth aspect of the embodiment of the invention in addition to the feature of the ninth aspect, the target clutch difference rotation speed calculating means 40 calculates the clutch difference rotation speed so that the clutch difference rotation speed becomes zero upon an elapse of the target clutch synchronizing time from the start of engagement of the clutch by gradually decreasing with time and the motor/generator rotation control means 40 controls the rotation speed of the motor/generator so that the clutch difference rotation speed under the clutch being in engagement becomes the target clutch difference rotation speed.

According to the tenth aspect of the embodiment of the invention, the target clutch difference rotation speed calculating means 40 calculates the clutch difference rotation speed so that the clutch difference rotation speed becomes zero upon an elapse of the target clutch synchronizing time from the start of engagement of the clutch by gradually decreasing with time. Further, the motor/generator rotation control means 40 controls the rotation speed of the motor/generator so that the clutch difference rotation speed under the clutch being in engagement becomes the target clutch difference rotation speed. Accordingly, since the clutch difference rotation speed is controlled to be gradually decreased with time from the start of engagement of the clutch, the heat generation amount at the time of engagement of the clutch can be limited to equal to or less than the allowable heat generation amount and generation of the vehicle shocks can be prevented.

According to an eleventh aspect of an embodiment of the invention, in addition to the feature of any one of the fourth through tenth aspects, a relationship between the allowable clutch difference rotation speed $\Delta\omega\_0max$ and the elapsed time "t" from the start of engagement of the clutch indicates a direct function in which the allowable clutch difference rotation speed gradually decreases as the elapsed time increases.

According to the eleventh aspect of the embodiment of the invention, the relationship between the allowable clutch difference rotation speed $\Delta\omega\_0max$ and the elapsed time "t" from the start of engagement of the clutch indicates a direct function in which the allowable clutch difference rotation speed gradually decreases as the elapsed time increases. Accordingly, based on the allowable clutch heat generation amount, the clutch difference rotation speed at the start of engagement can be surely and easily calculated.

According to a twelfth aspect of an embodiment of the invention, in addition to the feature of any one of the first through third aspects above, the hybrid drive device 100, 200 further includes an allowable clutch synchronizing time calculating means 40 which calculates an allowable clutch synchronizing time Tstmax which corresponds to the allowable clutch synchronizing time when the clutch is engaged based on the allowable clutch heat generation amount and the motor/generator rotation control means controls the rotation speed of the motor/generator so that the clutch difference rotation speed becomes zero in a time equal to or less than the allowable clutch synchronizing time by gradually decreasing with time from the start of engagement of the clutch.

According to the twelfth aspect of the embodiment of the invention, the hybrid drive device 100, 200 further includes an allowable clutch synchronizing time calculating means 40 which calculates an allowable clutch synchronizing time Tstmax which corresponds to the allowable clutch synchronizing time when the clutch is engaged based on the allowable clutch heat generation amount and the motor/generator rotation control means controls the rotation speed of the motor/generator so that the clutch difference rotation speed becomes zero in a time period of the allowable clutch synchronizing time or less by gradually decreasing with time from the start of engagement of the clutch. Accordingly, since the clutch synchronizing time before the clutch being engaged is set to be less than the allowable clutch synchronizing time which is calculated not to exceed the allowable clutch heat generation amount, the heat generation amount under the clutch being in engagement can be prevented from exceeding the allowable clutch heat generation amount.

According to a thirteenth aspect of an embodiment of the invention, in addition to the feature of any one of the first through twelfth aspects, the hybrid drive device 100, 200 further includes a target clutch transmitting torque calculating means 40 for calculating a target clutch transmitting torque which corresponds to a transmitting torque under the clutch being in engagement and a clutch control means 40 for controlling the clutch so that the transmitting torque under the clutch being in engagement becomes the target clutch transmitting torque.

According to the thirteenth aspect of the embodiment of the invention, the hybrid drive device further includes a target clutch transmitting torque calculating means 40 for calculating a target clutch transmitting torque Tct which corresponds to a transmitting torque under the clutch being in engagement and a clutch control means for controlling the clutch so that the transmitting torque under the clutch being in engagement becomes the target clutch transmitting torque. Accordingly, the clutch transmitting torque would not be changed and be kept to be constant at the time of clutch engagement. Thus, since the clutch transmitting torque becomes constant at the time of engagement of the clutch 20, the clutch heat generation amount which depends on the transmitting torque can be limited to the allowable clutch heat generation amount which is estimated in advance.

The invention claimed is:

1. A hybrid drive device comprising:
   an engine which outputs a rotation drive force to an output shaft;
   an input shaft which is rotated in association with a rotation of a drive wheel;
   a clutch disposed between the output shaft and the input shaft for connecting or disconnecting the output shaft and the input shaft;
   a motor/generator which is rotated in association with a rotation of the input shaft;
   an allowable clutch heat generation amount calculating means for calculating an allowable clutch heat generation amount which corresponds to a heat generation amount that the clutch can allow under the clutch being in engagement;
   a motor/generator rotation control means for controlling a rotation speed of the motor/generator not to exceed the allowable clutch heat generation amount calculated by the allowable clutch heat generation amount calculating means; and
   an allowable clutch difference rotation speed calculating means for calculating an allowable clutch difference rotation speed which corresponds to a difference rotation speed between the output shaft and the input shaft based on the allowable clutch heat generation amount, wherein the motor/generator rotation control means controls the rotation speed of the motor/generator so that a clutch difference rotation speed which corresponds to the difference rotation speed between the output shaft and the input shaft becomes equal to or less than the allowable clutch difference rotation speed;
   wherein the allowable clutch difference rotation speed calculating means calculates the allowable clutch difference rotation speed at a start of engagement which corresponds to the difference rotation speed between the output shaft and the input shaft at the start of engagement of the clutch and the motor/generator rotation control means controls the rotation speed of the motor/generator so that the clutch difference rotation speed at the start of engagement which corresponds to the difference rotation speed between the output shaft and the input shaft at the start of engagement of the clutch becomes equal to or less than the allowable clutch difference rotation speed at the start of engagement; and wherein the allowable clutch difference rotation speed calculating means calculates the allowable clutch difference rotation speed at the start of engagement based on the allowable clutch heat generation amount, a friction torque of the engine, an inertia of the engine and a target clutch synchronizing time which is a target elapsed time from the start of engagement of the clutch to a completion of synchronization of the output shaft and the input shaft.

2. A hybrid drive device comprising:

an engine which outputs a rotation drive force to an output shaft;

an input shaft which is rotated in association with a rotation of a drive wheel;

a clutch disposed between the output shaft and the input shaft for connecting or disconnecting the output shaft and the input shaft;

a motor/generator which is rotated in association with a rotation of the input shaft;

an allowable clutch heat generation amount calculating means for calculating an allowable clutch heat generation amount which corresponds to a heat generation amount that the clutch can allow under the clutch being in engagement;

a motor/generator rotation control means for controlling a rotation speed of the motor/generator not to exceed the allowable clutch heat generation amount calculated by the allowable clutch heat generation amount calculating means;

an allowable clutch difference rotation speed calculating means for calculating an allowable clutch difference rotation speed which corresponds to a difference rotation speed between the output shaft and the input shaft based on the allowable clutch heat generation amount, wherein the motor/generator rotation control means controls the rotation speed of the motor/generator so that a clutch difference rotation speed which corresponds to the difference rotation speed between the output shaft and the input shaft becomes equal to or less than the allowable clutch difference rotation speed; and a target input shaft rotation speed calculating means which calculates a target input shaft rotation speed which corresponds to a target rotation speed of the input shaft under the clutch being in engagement based on the allowable clutch difference rotation speed at the start of engagement and the target clutch synchronizing time which is the target elapsed time from the start of engagement of the clutch to the completion of synchronization of the output shaft and the input shaft, wherein the motor/generator rotation control means controls the rotation speed of the motor/generator so that the rotation speed of the input shaft under the clutch being in engagement becomes equal to or less than the target input shaft rotation speed;

wherein the allowable clutch difference rotation speed calculating means calculates the allowable clutch difference rotation speed at a start of engagement which corresponds to the difference rotation speed between the output shaft and the input shaft at the start of engagement of the clutch and the motor/generator rotation control means controls the rotation speed of the motor/generator so that the clutch difference rotation speed at the start of engagement which corresponds to the difference rotation speed between the output shaft and the input shaft at the start of engagement of the clutch becomes equal to or less than the allowable clutch difference rotation speed at the start of engagement; and wherein the target input shaft rotation speed calculating means calculates the target input shaft rotation speed so that the target input shaft rotation speed becomes zero upon an elapse of the target clutch synchronizing time from the start of engagement of the clutch by gradually decreasing with time and the motor/generator rotation control means controls the rotation speed of the motor/generator so that the rotation speed of the input shaft under the clutch being in engagement becomes the target input shaft rotation speed.

3. A hybrid drive device comprising:

an engine which outputs a rotation drive force to an output shaft;

an input shaft which is rotated in association with a rotation of a drive wheel;

a clutch disposed between the output shaft and the input shaft for connecting or disconnecting the output shaft and the input shaft;

a motor/generator which is rotated in association with a rotation of the input shaft;

an allowable clutch heat generation amount calculating means for calculating an allowable clutch heat generation amount which corresponds to a heat generation amount that the clutch can allow under the clutch being in engagement;

a motor/generator rotation control means for controlling a rotation speed of the motor/generator not to exceed the allowable clutch heat generation amount calculated by the allowable clutch heat generation amount calculating means; and an allowable clutch difference rotation speed calculating means for calculating an allowable clutch difference rotation speed which corresponds to a difference rotation speed between the output shaft and the input shaft based on the allowable clutch heat generation amount, wherein the motor/generator rotation control means controls the rotation speed of the motor/generator so that a clutch difference rotation speed which corresponds to the difference rotation speed between the output shaft and the input shaft becomes equal to or less than the allowable clutch difference rotation speed;

wherein the allowable clutch difference rotation speed calculating means calculates the allowable clutch difference rotation speed at a start of engagement which corresponds to the difference rotation speed between the output shaft and the input shaft at the start of engagement of the clutch and the motor/generator rotation control means controls the rotation speed of the motor/generator so that the clutch difference rotation speed at the start of engagement which corresponds to the difference rotation speed between the output shaft and the input shaft at the start of engagement of the clutch becomes equal to or less than the allowable clutch difference rotation speed at the start of engagement; and wherein the relationship between the allowable clutch difference rotation speed and the elapsed time from the start of engagement of the clutch is a direct function in which the allowable clutch difference rotation speed gradually decreases as the elapsed time increases.

4. A hybrid drive device comprising:

an engine which outputs a rotation drive force to an output shaft;

an input shaft which is rotated in association with a rotation of a drive wheel;

a clutch disposed between the output shaft and the input shaft for connecting or disconnecting the output shaft and the input shaft;

a motor/generator which is rotated in association with a rotation of the input shaft;

an allowable clutch heat generation amount calculating means for calculating an allowable clutch heat generation amount which corresponds to a heat generation amount that the clutch can allow under the clutch being in engagement; and a motor/generator rotation control means for controlling a rotation speed of the motor/generator not to exceed the allowable clutch heat generation amount calculated by the allowable clutch heat generation amount calculating means; and an allowable clutch synchronizing time calculating means which calculates an allowable clutch synchronizing time which corresponds to the allowable clutch synchronizing time when the clutch is engaged based on the allowable clutch heat generation amount and the motor/generator rotation control means controls the rotation speed of the motor/generator so that the clutch difference rotation speed becomes zero in a time equal to or less than the allowable clutch synchronizing time by gradually decreasing with time from the start of engagement of the clutch.

* * * * *